(12) United States Patent
Li et al.

(10) Patent No.: US 11,222,211 B2
(45) Date of Patent: Jan. 11, 2022

(54) METHOD AND APPARATUS FOR SEGMENTING VIDEO OBJECT, ELECTRONIC DEVICE, AND STORAGE MEDIUM

(71) Applicant: BEIJING SENSETIME TECHNOLOGY DEVELOPMENT CO., LTD, Beijing (CN)

(72) Inventors: Xiaoxiao Li, Beijing (CN); Yuankai Qi, Beijing (CN); Zhe Wang, Beijing (CN); Kai Chen, Beijing (CN); Ziwei Liu, Beijing (CN); Jianping Shi, Beijing (CN); Ping Luo, Beijing (CN); Chen Change Loy, Beijing (CN); Xiaoou Tang, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 213 days.

(21) Appl. No.: 16/236,482

(22) Filed: Dec. 29, 2018

(65) Prior Publication Data

US 2019/0138816 A1 May 9, 2019

Related U.S. Application Data

(63) Continuation of application No. PCT/CN2018/097106, filed on Jul. 25, 2018.

(30) Foreign Application Priority Data

Jul. 26, 2017 (CN) .......................... 201710619408.0

(51) Int. Cl.
*G06K 9/00* (2006.01)
*G06K 9/46* (2006.01)
(Continued)

(52) U.S. Cl.
CPC ..... *G06K 9/00765* (2013.01); *G06K 9/00744* (2013.01); *G06K 9/3233* (2013.01);
(Continued)

(58) Field of Classification Search
CPC ........... G06K 9/00765; G06K 9/00744; G06K 9/3233; G06K 9/4609; G06K 9/6201; G06K 9/6262; G06T 7/10
See application file for complete search history.

(56) References Cited

U.S. PATENT DOCUMENTS 5,572,258 A * 11/1996 Yokoyama ............. H04N 19/51
348/415.1
6,157,677 A 12/2000 Martens
(Continued)

FOREIGN PATENT DOCUMENTS

CN 101299277 A 11/2008
CN 101389037 A 3/2009
(Continued)

OTHER PUBLICATIONS

English translation of the Written Opinion of the International Search Authority in the international application No. PCT/CN2018/097106, dated Oct. 31, 2018.
(Continued)

*Primary Examiner* — Qun Shen
(74) *Attorney, Agent, or Firm* — Syncoda LLC; Feng Ma

(57) ABSTRACT

A method and an apparatus for segmenting a video object, an electronic device, a storage medium, and a program include: performing, among at least some frames of a video, inter-frame transfer of an object segmentation result of a reference frame in sequence from the reference frame, to obtain an object segmentation result of at least one other frame among the at least some frames; determining other frames having lost objects with respect to the object seg-
(Continued)

mentation result of the reference frame among the at least some frames; using the determined other frames as target frames to segment the lost objects, so as to update the object segmentation results of the target frames; and transferring the updated object segmentation results of the target frames to the at least one other frame in the video in sequence. The accuracy of video object segmentation results can therefore be improved.

20 Claims, 9 Drawing Sheets

(51) Int. Cl.
    *G06K 9/62*         (2006.01)
    *G06T 7/10*         (2017.01)
    *G06K 9/32*         (2006.01)

(52) U.S. Cl.
    CPC ......... *G06K 9/4609* (2013.01); *G06K 9/6201* (2013.01); *G06K 9/6262* (2013.01); *G06T 7/10* (2017.01); *G06T 2207/10016* (2013.01)

(56) References Cited

U.S. PATENT DOCUMENTS

| | | | |
|---|---|---|---|
| 9,390,511 B2 | 7/2016 | Ehmann | |
| 9,756,248 B1* | 9/2017 | Wu .......................... | G06T 7/174 |
| 2006/0070006 A1* | 3/2006 | Erol ....................... | H04N 19/90 |
| | | | 715/764 |
| 2008/0166045 A1* | 7/2008 | Xu ........................... | G06T 7/251 |
| | | | 382/170 |
| 2015/0054974 A1 | 2/2015 | Ehmann | |
| 2016/0111129 A1* | 4/2016 | Crivelli .............. | G06K 9/00744 |
| | | | 386/282 |
| 2017/0213100 A1* | 7/2017 | Yun ......................... | G06T 7/174 |
| 2017/0311013 A1* | 10/2017 | Acharya ................. | H04L 67/12 |
| 2017/0372479 A1* | 12/2017 | Somanath ............... | G06T 7/136 |
| 2018/0005034 A1* | 1/2018 | Kaehler ............. | G06K 9/00671 |

FOREIGN PATENT DOCUMENTS

| | | |
|---|---|---|
| CN | 102598673 A | 7/2012 |
| CN | 102637253 A | 8/2012 |
| CN | 103985114 A | 8/2014 |
| CN | 104134217 A | 11/2014 |
| CN | 104361601 A | 2/2015 |
| CN | 106447689 A | 2/2017 |
| CN | 106599789 A | 4/2017 |
| CN | 106897742 A | 6/2017 |
| CN | 108229290 A | 6/2018 |

OTHER PUBLICATIONS

First Office Action of the Chinese application No. 201710619408.0, dated Jan. 6, 2020.
Cheng Tingting, "An Automatic Video Multiple Object Segmentation Based on Higher Order CRF", Issue 3, Mar. 15, 2016, A Thesis Submitted to Ningbo University for the Master's Degree.
Tong Xiao et al, "Joint Detection and Identification Feature Learning for Person Search", The Chinese University of Hong Kong; Harbin Institute of Technology; SenseTime Group Limited, dated Apr. 6, 2017.
Xiaoxiao Li et al, "Video Object Segmentation with Re-identification", The Chinese University of Hong Kong; Harbin Institute of Technology; SenseTime Group Limited, mailed on Aug. 1, 2017.
International Search Report in the international application No. PCT/CN2018/097106, dated Oct. 31, 2018.
Xiaoxiao Li and Chen Change Loy:"Video Object Segmentation with Joint Re-identification and Attention-Aware Mask Propagation". This ECCV 2018 paper, provided here by the Computer Vision Foundation, is the author-created version.The content of this paper is identical to the content of the officially published ECCV 2018LNCS version of the paper as available on SpringerLink: https://link.springer.com/conference/eccv.
Hanqing Jiang, etc., Spatio-Temporal Video Segmentation of Static Scenes and Its Applications, IEEE Transactions on Multimedia, Jan. 31, 2011 (Jan. 31, 2015), p. 3-15.
Xinmei Li, Research on Tracking Algorithm of Visual Face, China's outstanding master's thesis full-text database, Feb. 15, 2015 (Feb. 15, 2011), p. I138-220.

\* cited by examiner

METHOD AND APPARATUS FOR SEGMENTING VIDEO OBJECT, ELECTRONIC DEVICE, AND STORAGE MEDIUM

This is a continuation application of International Patent Application No. PCT/CN2018/097106 filed on Jul. 25, 2018, which claims priority to Chinese Patent Application No. 201710619408.0 filed on Jul. 26, 2017 and entitled "METHOD AND APPARATUS FOR SEGMENTING VIDEO OBJECT, ELECTRONIC DEVICE, STORAGE MEDIUM, AND PROGRAM," the disclosure of which is hereby incorporated by reference in their entireties.

TECHNICAL FIELD

The present disclosure relates to computer vision technologies, and in particular, to a method and an apparatus for segmenting a video object, an electronic device, a storage medium, and a program.

BACKGROUND

Because deep convolutional neural networks have powerful learning capabilities and have a large amount of marked data for learning, in recent years, deep convolutional neural networks have achieved great success in many computer vision tasks.

In the field of computer vision, object segmentation in video refers to a process of grouping/segmentation of pixels in a frame of a video based on different objects, thereby subdividing the frame into multiple image sub-regions (a set of pixels). Object segmentation in video has important applications in many fields such as intelligent video analysis, security monitoring, and automatic driving, etc.

SUMMARY

Embodiments of the present disclosure provide technical solutions for video object segmentation.

A method for segmenting a video object provided according to one aspect of the embodiments of the present disclosure includes:

performing, among at least some frames of a video, inter-frame transfer of an object segmentation result of a reference frame in sequence from the reference frame, to obtain an object segmentation result of at least one other frame among the at least some frames;

determining other frames having lost objects with respect to the object segmentation result of the reference frame among the at least some frames;

using the determined other frames as target frames to segment the lost objects, so as to update the object segmentation results of the target frames; and transferring the updated object segmentation results of the target frames to the at least one other frame in the video in sequence.

According to one or more embodiments of the present disclosure, in any one of method embodiments of the present disclosure, the reference frame includes: the first frame among the at least some frames; the performing inter-frame transfer of an object segmentation result of a reference frame in sequence from the reference frame includes: performing inter-frame transfer on the object segmentation result of the first frame in a forward timing direction among the at least some frames till the last frame among the at least some frames; or the reference frame includes: the last frame among the at least some frames; the performing inter-frame transfer of an object segmentation result of a reference frame in sequence from the reference frame includes: performing inter-frame transfer on the object segmentation result of the last frame in a reverse timing direction among the at least some frames till the first frame among the at least some frames; or the reference frame includes: a middle frame located between the first frame and the last frame among the at least some frames; the performing inter-frame transfer of an object segmentation result of a reference frame in sequence from the reference frame includes: performing inter-frame transfer on the object segmentation result of the middle frame in the forward timing direction among the at least some frames till the last frame among the at least some frames; and/or performing inter-frame transfer on the object segmentation result of the middle frame in the reverse timing direction among the at least some frames till the first frame among the at least some frames.

According to one or more embodiments of the present disclosure, in any one of the foregoing method embodiments of the present disclosure, the performing inter-frame transfer of an object segmentation result of a reference frame in sequence from the reference frame, to obtain an object segmentation result of at least one other frame among the at least some frames includes:

determining, according to the object segmentation result of a preceding frame in a propagation direction of the object segmentation result of the reference frame, the object segmentation result of a succeeding frame in the propagation direction, the propagation direction including the forward timing direction and/or the reverse timing frame of the video.

According to one or more embodiments of the present disclosure, in any one of the foregoing method embodiments of the present disclosure, the preceding frame includes: a neighboring frame or a neighboring key frame of the succeeding frame in the forward timing direction or the reverse timing direction among the at least some frames.

According to one or more embodiments of the present disclosure, in any one of the foregoing method embodiments of the present disclosure, the determining, according to the object segmentation result of a preceding frame in a propagation direction of the object segmentation result of the reference frame, the object segmentation result of a succeeding frame in the propagation direction includes:

obtaining an image block including at least one object from the succeeding frame; obtaining a probability map block of an object category respectively corresponding to the at least one object from an object category probability map of the preceding frame; and determining the object segmentation result of the at least one object in the succeeding frame at least according to the image block and the probability map block.

According to one or more embodiments of the present disclosure, in any one of the foregoing method embodiments of the present disclosure, the determining the object segmentation result of the at least one object in the succeeding frame at least according to the image block and the probability map block includes:

separately zooming in the image block and the probability map block to a preset size;

obtaining the object segmentation result of the at least one object in the succeeding frame under the preset size according to the separately zoomed-in image block and probability map block; and restoring the object segmentation result of the at least one object under the preset size to the object segmentation result under an original size according to the zoom-in ratio of the image block and the probability map block.

According to one or more embodiments of the present disclosure, in any one of the foregoing method embodiments of the present disclosure, the method further includes: obtaining an optical flow map block corresponding to the at least one object according to an optical flow map between the preceding frame and the succeeding frame, where the determining the object segmentation result of the at least one object in the succeeding frame at least according to the image block and the probability map block includes: determining the object segmentation result of the at least one object in the succeeding frame according to the image block, the probability map block, and the optical flow map block.

According to one or more embodiments of the present disclosure, in any one of the foregoing method embodiments of the present disclosure, the determining the object segmentation result of the at least one object in the succeeding frame according to the image block, the probability map block, and the optical flow map block includes:

obtaining a first object segmentation result of the at least one object in the succeeding frame according to the image block and the probability map block; and obtaining a second object segmentation result of the at least one object in the succeeding frame according to the probability map block and the optical flow map block; and obtaining the object segmentation result of the at least one object in the succeeding frame according to the first object segmentation result and the second object segmentation result.

According to one or more embodiments of the present disclosure, in any one of the foregoing method embodiments of the present disclosure, the determining the object segmentation result of the at least one object in the succeeding frame according to the image block, the probability map block, and the optical flow map block includes:

separately zooming in the image block, the probability map block, and the optical flow map block to a preset size;

obtaining the object segmentation result of the at least one object in the succeeding frame under the preset size according to the separately zoomed-in image block, probability map block, and optical flow map block; and restoring the object segmentation result of the at least one object under the preset size to the object segmentation result under an original size according to the zoom-in ratio of the image block, the probability map block, and the optical flow map block.

According to one or more embodiments of the present disclosure, in any one of the foregoing method embodiments of the present disclosure, the obtaining the object segmentation result of the at least one object in the succeeding frame under the preset size according to the separately zoomed-in image block, probability map block, and optical flow map block includes:

obtaining a third object segmentation result of the at least one object in the succeeding frame according to the separately zoomed-in image block and probability map block; and obtaining a fourth object segmentation result of the at least one object in the succeeding frame according to the separately zoomed-in probability map block and optical flow map block; and determining the object segmentation result of the at least one object in the succeeding frame under the preset size according to the third object segmentation result and the fourth object segmentation result.

According to one or more embodiments of the present disclosure, in any one of the foregoing method embodiments of the present disclosure, the image block is larger than an object candidate box of the object, and is less than the image of the succeeding frame in size.

According to one or more embodiments of the present disclosure, in any one of the foregoing method embodiments of the present disclosure, the determining other frames having lost objects with respect to the object segmentation result of the reference frame among the at least some frames includes:

performing, by using any other frame among the at least some frames as a current frame, object detection on the current frame to obtain an object candidate box set of the current frame;

respectively matching at least one object candidate box included in an object detection box set of the current frame with the object subsequent box corresponding to the object segmentation result of the reference frame; and determining, according to the matching result, whether the current frame is one of the other frames having lost objects with respect to the object segmentation result of the reference frame.

According to one or more embodiments of the present disclosure, in any one of the foregoing method embodiments of the present disclosure, the matching at least one object candidate box included in an object detection box set with the object candidate box corresponding to the object segmentation result of the reference frame includes: separately performing feature extraction on the at least one object candidate box included in the object detection box set; and matching the features of the at least one object candidate box included in the object detection box set with the features of the object candidate box corresponding to the object segmentation result of the reference frame;

the determining, according to the matching result, whether the current frame is one of the other frames having lost objects with respect to the object segmentation result of the reference frame includes: determining, according to the matching result, whether object candidate boxes that have a feature similarity of greater than a preset threshold and are inconsistent in corresponding object categories according to the object segmentation result exist in the at least one object candidate box included in the object detection box set and the object candidate boxes corresponding to the object segmentation result of the reference frame; if the object candidate boxes that have the feature similarity of greater than the preset threshold and are inconsistent in corresponding object categories according to the object segmentation result exist, determining that the current frame is one of the other frames having lost objects with respect to the object segmentation result of the reference frame; otherwise, determining that the current frame is not one of the other frames having lost objects with respect to the object segmentation result of the reference frame.

According to one or more embodiments of the present disclosure, in any one of the foregoing method embodiments of the present disclosure, the determining other frames having lost objects with respect to the object segmentation result of the reference frame among the at least some frames includes:

separately performing object detection on at least one other frame among the at least some frames to obtain an object candidate box set;

matching at least one object candidate box included in an object detection box set with the object candidate box corresponding to the object segmentation result of the reference frame; and determining the other frames having lost objects with respect to the object segmentation result of the reference frame among the at least some frames according to the matching result.

According to one or more embodiments of the present disclosure, in any one of the foregoing method embodiments of the present disclosure, the matching at least one object candidate box included in an object detection box set with the object candidate box corresponding to the object segmentation result of the reference frame includes: separately performing feature extraction on the at least one object candidate box included in the object detection box set; and matching the features of the at least one object candidate box included in the object detection box set with the features of the object candidate box corresponding to the object segmentation result of the reference frame;

the determining the other frames having lost objects with respect to the object segmentation result of the reference frame among the at least some frames according to the matching result includes: obtaining, according to the matching result, object candidate boxes that have a feature similarity of greater than a preset threshold and are inconsistent in corresponding object categories according to the object segmentation result in the at least one object candidate box included in the object detection box set and the object candidate box corresponding to the object segmentation result of the reference frame; and obtaining the frames corresponding to the object candidate boxes in the object detection box set that have the feature similarity of greater than the preset threshold and are inconsistent in corresponding object categories according to the object segmentation result, as the other frames having lost objects with respect to the object segmentation result of the reference frame.

According to one or more embodiments of the present disclosure, in any one of the foregoing method embodiments of the present disclosure, the using the determined other frames as target frames includes:

if the other frames having lost objects with respect to the object segmentation result of the reference frame among the at least some frames are plural, selecting one of the other frames having lost objects with respect to the object segmentation result of the reference frame as the target frame.

According to one or more embodiments of the present disclosure, in any one of the foregoing method embodiments of the present disclosure, the transferring the updated object segmentation results of the target frames to the at least one other frame in the video in sequence includes:

obtaining consecutive frames in which the lost objects are lost among the at least some frames; and transferring the updated object segmentation results of the target frames to the at least one other frame among the consecutive frames in sequence.

According to one or more embodiments of the present disclosure, in any one of the foregoing method embodiments of the present disclosure, the at least one other frame includes: the last frame among the consecutive frames; and the transferring the updated object segmentation results of the target frames to the at least one other frame among the consecutive frames in sequence includes: transferring the updated object segmentation results of the target frames to the first frame among the consecutive frames in sequence in the reverse timing direction among the consecutive frames; or the at least one other frame includes: the last frame among the consecutive frames; and the transferring the updated object segmentation results of the target frames to the at least one other frame among the consecutive frames in sequence includes: transferring the updated object segmentation results of the target frames to the first frame among the consecutive frames in sequence in the reverse timing direction among the consecutive frames; or the at least one other frame includes: a middle frame located between the first frame and the last frame among the consecutive frames; and the transferring the updated object segmentation results of the target frames to the at least one other frame among the consecutive frames in sequence includes: transferring the updated object segmentation results of the target frames to the last frame among the consecutive frames in sequence in the forward timing direction among the consecutive frames; and/or transferring the updated object segmentation results of the target frames to the first frame among the consecutive frames in sequence in the reverse timing direction among the consecutive frames.

According to one or more embodiments of the present disclosure, in any one of the foregoing method embodiments of the present disclosure, for the same lost object, the other frames to which the updated object segmentation results of the target frames are transferred this time do not overlap the other frames to which the updated object segmentation results of the target frames are transferred previously in range.

Another method for segmenting a video object provided according to another aspect of the embodiments of the present disclosure includes:

obtaining an image block including at least one object from a current frame in a video; obtaining a probability map block of an object category corresponding to the at least one object from an object category probability map of an adjacent frame of the current frame; and determining an object segmentation result of the at least one object in the current frame at least according to the image block and the probability map block.

According to one or more embodiments of the present disclosure, in any embodiment of the foregoing another method for segmenting a video object of the present disclosure, the determining an object segmentation result of the at least one object in the current frame at least according to the image block and the probability map block includes:

separately zooming in the image block and the probability map block to a preset size;

obtaining the object segmentation result of the at least one object in the current frame under the preset size according to the separately zoomed-in image block and probability map block; and restoring the object segmentation result of the at least one object under the preset size to the object segmentation result under an original size according to the zoom-in ratio of the image block and the probability map block.

According to one or more embodiments of the present disclosure, in any embodiment of the foregoing another method for segmenting a video object of the present disclosure, the method further includes: obtaining an optical flow map block corresponding to the at least one object according to an optical flow map between the adjacent frame and the current frame, where the determining an object segmentation result of the at least one object in the current frame at least according to the image block and the probability map block includes: determining the object segmentation result of the at least one object in the current frame according to the image block, the probability map block, and the optical flow map block.

According to one or more embodiments of the present disclosure, in any embodiment of the foregoing another method for segmenting a video object of the present disclosure, the determining the object segmentation result of the at least one object in the current frame according to the image block, the probability map block, and the optical flow map block includes:

obtaining a first object segmentation result of the at least one object in the current frame according to the image block and the probability map block; and obtaining a second object segmentation result of the at least one object in the current frame according to the probability map block and the optical flow map block; and obtaining the object segmentation result of the at least one object in the current frame according to the first object segmentation result and the second object segmentation result.

According to one or more embodiments of the present disclosure, in any embodiment of the foregoing another method for segmenting a video object of the present disclosure, the determining the object segmentation result of the at least one object in the current frame according to the image block, the probability map block, and the optical flow map block includes:

separately zooming in the image block, the probability map block, and the optical flow map block to a preset size;

obtaining the object segmentation result of the at least one object in the current frame under the preset size according to the separately zoomed-in image block, probability map block, and optical flow map block; and restoring the object segmentation result of the at least one object under the preset size to the object segmentation result under an original size according to the zoom-in ratio of the image block, the probability map block, and the optical flow map block.

According to one or more embodiments of the present disclosure, in any embodiment of the foregoing another method for segmenting a video object of the present disclosure, the determining the object segmentation result of the at least one object in the current frame under the preset size according to the separately zoomed-in image block, probability map block, and optical flow map block includes:

obtaining a third object segmentation result of the object in the current frame according to the separately zoomed-in image block and probability map block; and obtaining a fourth object segmentation result of the at least one object in the current frame according to the separately zoomed-in probability map block and optical flow map block; and determining the object segmentation result of the at least one object in the current frame under the preset size according to the third object segmentation result and the fourth object segmentation result.

According to one or more embodiments of the present disclosure, in any embodiment of the foregoing another method for segmenting a video object of the present disclosure, the adjacent frame of the current frame includes: a neighboring frame or a neighboring key frame of the current frame in the video in the forward timing direction or the reverse timing direction.

According to one or more embodiments of the present disclosure, in any embodiment of the foregoing another method for segmenting a video object of the present disclosure, the image block is larger than an object candidate box of the object, and is less than the image of the adjacent frame in size.

An apparatus for segmenting a video object provided according to still another aspect of the embodiments of the present disclosure includes:

the transfer network is configured to perform, among at least some frames of a video, inter-frame transfer of an object segmentation result of a reference frame in sequence from the reference frame, to obtain an object segmentation result of at least one other frame among the at least some frames; and transfer updated object segmentation results of target frames obtained by the object re-identification network to the at least one other frame in the video in sequence;

the object re-identification network is configured to determine other frames having lost objects with respect to the object segmentation result of the reference frame among the at least some frames; and use the determined other frames as the target frames to segment the lost objects, so as to update the object segmentation results of the target frames.

According to one or more embodiments of the present disclosure, in any one of the foregoing apparatus embodiments of the present disclosure, the reference frame includes: the first frame among the at least some frames; the transfer network is configured to perform inter-frame transfer on the object segmentation result of the first frame in a forward timing direction among the at least some frames till the last frame among the at least some frames; or the reference frame includes: the last frame among the at least some frames; the transfer network is configured to perform inter-frame transfer on the object segmentation result of the last frame in a reverse timing direction among the at least some frames till the first frame among the at least some frames; or the reference frame includes: a middle frame located between the first frame and the last frame among the at least some frames; the performing inter-frame transfer of an object segmentation result of a reference frame in sequence from the reference frame includes: performing inter-frame transfer on the object segmentation result of the middle frame in the forward timing direction among the at least some frames till the last frame among the at least some frames; and/or performing inter-frame transfer on the object segmentation result of the middle frame in the reverse timing direction among the at least some frames till the first frame among the at least some frames.

According to one or more embodiments of the present disclosure, in any one of the foregoing apparatus embodiments of the present disclosure, the transfer network is configured, when performing the inter-frame transfer of the object segmentation result of the reference frame in sequence from the reference frame, to obtain the object segmentation result of the at least one other frame among the at least some frames, to:

determine, according to the object segmentation result of a preceding frame in a propagation direction of the object segmentation result of the reference frame, the object segmentation result of a succeeding frame in the propagation direction, the propagation direction including the forward timing direction and/or the reverse timing frame of the video;

the preceding frame includes: a neighboring frame or a neighboring key frame of the succeeding frame in the forward timing direction or the reverse timing direction among the at least some frames.

According to one or more embodiments of the present disclosure, in any one of the foregoing apparatus embodiments of the present disclosure, the transfer network includes:

a first obtaining module, configured to obtain an image block including at least one object from the succeeding frame, and obtain a probability map block of an object category respectively corresponding to the at least one object from an object category probability map of the preceding frame; and a determining module, configured to determine the object segmentation result of the at least one object in the succeeding frame at least according to the image block and the probability map block.

According to one or more embodiments of the present disclosure, in any one of the foregoing apparatus embodiments of the present disclosure, the determining module includes:

a first zooming unit, configured to separately zoom in the image block and the probability map block to a preset size;

a first neural network, configured to obtain the object segmentation result of the at least one object in the succeeding frame under the preset size according to the separately zoomed-in image block and probability map block; and a second zooming unit, configured to restore the object segmentation result of the at least one object under the preset size to the object segmentation result under an original size according to the zoom-in ratio of the image block and the probability map block.

According to one or more embodiments of the present disclosure, in any one of the foregoing apparatus embodiments of the present disclosure, the first obtaining module is further configured to obtain an optical flow map block corresponding to the at least one object according to an optical flow map between the preceding frame and the succeeding frame; and the determining module is configured to determine the object segmentation result of the at least one object in the succeeding frame according to the image block, the probability map block, and the optical flow map block.

According to one or more embodiments of the present disclosure, in any one of the foregoing apparatus embodiments of the present disclosure, the determining module includes:

the first neural network, configured to obtain a first object segmentation result of the at least one object in the succeeding frame according to the image block and the probability map block;

a second neural network, configured to obtain a second object segmentation result of the at least one object in the succeeding frame according to the probability map block and the optical flow map block; and a computing unit, configured to obtain the object segmentation result of the at least one object in the succeeding frame according to the first object segmentation result and the second object segmentation result.

According to one or more embodiments of the present disclosure, in any one of the foregoing apparatus embodiments of the present disclosure, the determining module includes:

the first zooming unit, configured to separately zoom in the image block, the probability map block, and the optical flow map block to a preset size;

an obtaining unit, configured to obtain the object segmentation result of the at least one object in the succeeding frame under the preset size according to the separately zoomed-in image block, probability map block, and optical flow map block;

and the second zooming unit, configured to restore the object segmentation result of the at least one object under the preset size to the object segmentation result under an original size according to the zoom-in ratio of the image block, the probability map block, and the optical flow map block.

According to one or more embodiments of the present disclosure, in any one of the foregoing apparatus embodiments of the present disclosure, the obtaining unit includes:

the first neural network, configured to obtain a third object segmentation result of the at least one object in the succeeding frame according to the separately zoomed-in image block and probability map block;

the first neural network, configured to obtain a fourth object segmentation result of the at least one object in the succeeding frame according to the separately zoomed-in probability map block and optical flow map block; and the computing unit, configured to determine the object segmentation result of the at least one object in the succeeding frame under the preset size according to the third object segmentation result and the fourth object segmentation result.

According to one or more embodiments of the present disclosure, in any one of the foregoing apparatus embodiments of the present disclosure, the image block is larger than an object candidate box of the object, and is less than the image of the succeeding frame in size.

According to one or more embodiments of the present disclosure, in any one of the foregoing apparatus embodiments of the present disclosure, the object re-identification network is configured, when determining the other frames having lost objects with respect to the object segmentation result of the reference frame among the at least some frames, to:

perform, by using any other frame among the at least some frames as a current frame, object detection on the current frame to obtain an object candidate box set of the current frame;

respectively match at least one object candidate box included in an object detection box set of the current frame with the object subsequent box corresponding to the object segmentation result of the reference frame; and determine, according to the matching result, whether the current frame is one of the other frames having lost objects with respect to the object segmentation result of the reference frame.

According to one or more embodiments of the present disclosure, in any one of the foregoing apparatus embodiments of the present disclosure, the object re-identification network is configured, when matching the at least one object candidate box included in the object detection box set with the object candidate box corresponding to the object segmentation result of the reference frame, to: separately perform feature extraction on the at least one object candidate box included in the object detection box set; and match the features of the at least one object candidate box included in the object detection box set with the features of the object candidate box corresponding to the object segmentation result of the reference frame;

the object re-identification network is configured, when determining, according to the matching result, whether the current frame is one of the other frames having lost objects with respect to the object segmentation result of the reference frame, to: determine, according to the matching result, whether object candidate boxes that have a feature similarity of greater than a preset threshold and are inconsistent in corresponding object categories according to the object segmentation result exist in the at least one object candidate box included in the object detection box set and the object candidate box corresponding to the object segmentation result of the reference frame; if the object candidate boxes that have the feature similarity of greater than the preset threshold and are inconsistent in corresponding object categories according to the object segmentation result exist, determine that the current frame is one of the other frames having lost objects with respect to the object segmentation result of the reference frame; otherwise, determine that the current frame is not one of the other frames having lost objects with respect to the object segmentation result of the reference frame.

According to one or more embodiments of the present disclosure, in any one of the foregoing apparatus embodiments of the present disclosure, the object re-identification network is configured, when determining the other frames having lost objects with respect to the object segmentation result of the reference frame among the at least some frames, to:

separately perform object detection on at least one other frame among the at least some frames to obtain an object candidate box set;

match at least one object candidate box included in an object detection box set with the object candidate box corresponding to the object segmentation result of the reference frame; and determine the other frames having lost objects with respect to the object segmentation result of the reference frame among the at least some frames according to the matching result.

According to one or more embodiments of the present disclosure, in any one of the foregoing apparatus embodiments of the present disclosure, the object re-identification network is configured, when matching the at least one object candidate box included in the object detection box set with the object candidate box corresponding to the object segmentation result of the reference frame, to: separately perform feature extraction on the at least one object candidate box included in the object detection box set; and match the features of the at least one object candidate box included in the object detection box set with the features of the object candidate box corresponding to the object segmentation result of the reference frame;

the object re-identification network is configured, when determining the other frames having lost objects with respect to the object segmentation result of the reference frame among the at least some frames according to the matching result, to: obtain, according to the matching result, object candidate boxes that have a feature similarity of greater than a preset threshold and are inconsistent in corresponding object categories according to the object segmentation result in the at least one object candidate box included in the object detection box set and the object candidate box corresponding to the object segmentation result of the reference frame; and obtain the frames corresponding to the object candidate boxes in the object detection box set that have the feature similarity of greater than the preset threshold and are inconsistent in corresponding object categories according to the object segmentation result, as the other frames having lost objects with respect to the object segmentation result of the reference frame.

According to one or more embodiments of the present disclosure, in any one of the foregoing apparatus embodiments of the present disclosure, the object re-identification network is configured, when using the determined other frames as the target frames, to: if the other frames having lost objects with respect to the object segmentation result of the reference frame among the at least some frames are plural, select one of the other frames having lost objects with respect to the object segmentation result of the reference frame as the target frame.

According to one or more embodiments of the present disclosure, in any one of the foregoing apparatus embodiments of the present disclosure, the transfer network is configured to, when transferring the updated object segmentation results of the target frames to the at least one other frame in the video in sequence, to:

obtain consecutive frames in which the lost objects are lost among the at least some frames; and transfer the updated object segmentation results of the target frames to the at least one other frame among the consecutive frames in sequence.

According to one or more embodiments of the present disclosure, in any one of the foregoing apparatus embodiments of the present disclosure, the at least one other frame includes: the first frame among the consecutive frames; and the transfer network is configured to: transfer the updated object segmentation results of the target frames to the last frame among the consecutive frames in sequence in the forward timing direction among the consecutive frames; or the at least one other frame includes: the last frame among the consecutive frames; and the transfer network is configured to: transfer the updated object segmentation results of the target frames to the first frame among the consecutive frames in sequence in the reverse timing direction among the consecutive frames; or the at least one other frame includes: a middle frame located between the first frame and the last frame among the consecutive frames; and the transfer network is configured to: transfer the updated object segmentation results of the target frames to the last frame among the consecutive frames in sequence in the forward timing direction among the consecutive frames; and/or transfer the updated object segmentation results of the target frames to the first frame among the consecutive frames in sequence in the reverse timing direction among the consecutive frames.

Another apparatus for segmenting a video object provided according to yet another aspect of the embodiments of the present disclosure includes:

a first obtaining module, configured to obtain an image block including at least one object from a current frame in a video; obtaining a probability map block of an object category corresponding to the at least one object from an object category probability map of an adjacent frame of the current frame; and a determining module, configured to determine the object segmentation result of the at least one object in the current frame at least according to the image block and the probability map block.

According to one or more embodiments of the present disclosure, in any embodiment of the foregoing another apparatus for segmenting a video object of the present disclosure, the determining module includes:

a first zooming unit, configured to separately zoom in the image block and the probability map block to a preset size;

a first neural network, configured to obtain the object segmentation result of the at least one object in the current frame under the preset size according to the separately zoomed-in image block and probability map block; and a second zooming unit, configured to restore the object segmentation result of the at least one object under the preset size to the object segmentation result under an original size according to the zoom-in ratio of the image block and the probability map block.

According to one or more embodiments of the present disclosure, in any embodiment of the foregoing another apparatus for segmenting a video object of the present disclosure, the first obtaining module is further configured to obtain an optical flow map block corresponding to the at least one object according to an optical flow map between the adjacent frame and the current frame; and the determining module is configured to determine the object segmentation result of the at least one object in the current frame according to the image block, the probability map block, and the optical flow map block.

According to one or more embodiments of the present disclosure, in any embodiment of the foregoing another apparatus for segmenting a video object of the present disclosure, the determining module includes:

the first neural network, configured to obtain a first object segmentation result of the at least one object in the current frame according to the image block and the probability map block;

a second neural network, configured to obtain a second object segmentation result of the at least one object in the current frame according to the probability map block and the optical flow map block; and a computing unit, configured to obtain the object segmentation result of the at least one object in the current frame according to the first object segmentation result and the second object segmentation result.

According to one or more embodiments of the present disclosure, in any embodiment of the foregoing another apparatus for segmenting a video object of the present disclosure, the determining module includes:

the first zooming unit, configured to separately zoom in the image block, the probability map block, and the optical flow map block to a preset size;

an obtaining unit, configured to obtain the object segmentation result of the at least one object in the current frame under the preset size according to the separately zoomed-in image block, probability map block, and optical flow map block; and the second zooming unit, configured to restore the object segmentation result of the at least one object under the preset size to the object segmentation result under an original size according to the zoom-in ratio of the image block, the probability map block, and the optical flow map block.

According to one or more embodiments of the present disclosure, in any embodiment of the foregoing another apparatus for segmenting a video object of the present disclosure, the obtaining unit includes:

the first neural network, configured to obtain a third object segmentation result of the at least one object in the current frame according to the separately zoomed-in image block and probability map block;

the first neural network, configured to obtain a fourth object segmentation result of the at least one object in the current frame according to the separately zoomed-in probability map block and optical flow map block; and the computing unit, configured to determine the object segmentation result of the at least one object in the current frame under the preset size according to the third object segmentation result and the fourth object segmentation result.

According to one or more embodiments of the present disclosure, in any embodiment of the foregoing another apparatus for segmenting a video object of the present disclosure, the adjacent frame of the current frame includes: a neighboring frame or a neighboring key frame of the current frame in the video in the forward timing direction or the reverse timing direction.

According to one or more embodiments of the present disclosure, in any embodiment of the foregoing another apparatus for segmenting a video object of the present disclosure, the image block is larger than an object candidate box of the object, and is less than the image of the adjacent frame in size.

An electronic device provided according to yet another aspect of the embodiments of the present disclosure includes the video object segment apparatus according to any one of the forgoing embodiments.

Another electronic device provided according to yet another aspect of the embodiments of the present disclosure includes:

a memory, configured to store executable instructions; and a processor, configured to communicate with the memory to execute the executable instructions so as to complete the operations of the method according to any one of the forgoing embodiments of the present disclosure.

A computer storage medium provided according to yet another aspect of the embodiments of the present disclosure is configured to store computer-readable instructions, where when the instructions are executed, the operations of the method according to any one of the foregoing embodiments of the present disclosure are implemented.

A computer program provided according to yet another aspect of the embodiments of the present disclosure includes computer-readable instructions, where when the computer-readable instructions run in a device, a processor in the device executes executable instructions for implementing the steps of the method according to any one of the foregoing embodiments of the present disclosure.

A method for segmenting a video object provided according to another aspect of the embodiments of the present disclosure includes: performing, among at least some frames of a video, inter-frame transfer of an object segmentation result of a reference frame in sequence from the reference frame, to obtain an object segmentation result of at least one other frame among the at least some frames; determining other frames having lost objects with respect to the object segmentation result of the reference frame among the at least some frames; using the determined other frames as target frames to segment the lost objects, so as to update the object segmentation results of the target frames; and transferring the updated object segmentation results of the target frames to the at least one other frame in the video in sequence.

According to one or more embodiments of the present disclosure, the reference frame includes: the first frame among the at least some frames; the performing inter-frame transfer of an object segmentation result of a reference frame in sequence from the reference frame includes: performing inter-frame transfer on the object segmentation result of the first frame in a forward timing direction among the at least some frames till the last frame among the at least some frames; or the reference frame includes: the last frame among the at least some frames; the performing inter-frame transfer of an object segmentation result of a reference frame in sequence from the reference frame includes: performing inter-frame transfer on the object segmentation result of the last frame in a reverse timing direction among the at least some frames till the first frame among the at least some frames; or the reference frame comprises: a middle frame located between the first frame and the last frame among the at least some frames; the performing inter-frame transfer of an object segmentation result of a reference frame in sequence from the reference frame includes at least one of the following: performing inter-frame transfer on the object segmentation result of the middle frame in the forward timing direction among the at least some frames till the last frame among the at least some frames; or performing inter-frame transfer on the object segmentation result of the middle frame in the reverse timing direction among the at least some frames till the first frame among the at least some frames.

According to one or more embodiments of the present disclosure, the performing the inter-frame transfer of the object segmentation result of the reference frame in sequence from the reference frame, to obtain the object segmentation result of the at least one other frame among the at least some frames includes: determining, according to the object segmentation result of a preceding frame in a propagation direction of the object segmentation result of the reference frame, the object segmentation result of a succeeding frame in the propagation direction, the propagation direction including at least one of the forward timing direction or the reverse timing frame of the video; wherein the preceding frame includes: a neighboring frame or a neighboring key frame of the succeeding frame in the forward timing direction or the reverse timing direction among the at least some frames.

According to one or more embodiments of the present disclosure, the determining, according to the object segmentation result of the preceding frame in the propagation direction of the object segmentation result of the reference frame, the object segmentation result of the succeeding frame in the propagation direction includes: obtaining an image block including at least one object from the succeeding frame; obtaining a probability map block of an object category respectively corresponding to the at least one object from an object category probability map of the preceding frame; and determining the object segmentation result of the at least one object in the succeeding frame at least according to the image block and the probability map block.

According to one or more embodiments of the present disclosure, the determining the object segmentation result of the at least one object in the succeeding frame at least according to the image block and the probability map block includes: separately zooming in the image block and the probability map block to a preset size; obtaining the object segmentation result of the at least one object in the succeeding frame under the preset size according to the separately zoomed-in image block and probability map block; and restoring the object segmentation result of the at least one object under the preset size to the object segmentation result under an original size according to the zoom-in ratio of the image block and the probability map block.

According to one or more embodiments of the present disclosure, the method further includes: obtaining an optical flow map block corresponding to the at least one object according to an optical flow map between the preceding frame and the succeeding frame, wherein the determining the object segmentation result of the at least one object in the succeeding frame at least according to the image block and the probability map block includes: determining the object segmentation result of the at least one object in the succeeding frame according to the image block, the probability map block, and the optical flow map block.

According to one or more embodiments of the present disclosure, the determining the object segmentation result of the at least one object in the succeeding frame according to the image block, the probability map block, and the optical flow map block includes: obtaining a first object segmentation result of the at least one object in the succeeding frame according to the image block and the probability map block; and obtaining a second object segmentation result of the at least one object in the succeeding frame according to the probability map block and the optical flow map block; and obtaining the object segmentation result of the at least one object in the succeeding frame according to the first object segmentation result and the second object segmentation result; or, the determining the object segmentation result of the at least one object in the succeeding frame according to the image block, the probability map block, and the optical flow map block includes: separately zooming in the image block, the probability map block, and the optical flow map block to a preset size; obtaining the object segmentation result of the at least one object in the succeeding frame under the preset size according to the separately zoomed-in image block, probability map block, and optical flow map block; and restoring the object segmentation result of the at least one object under the preset size to the object segmentation result under an original size according to the zoom-in ratio of the image block, the probability map block, and the optical flow map block.

According to one or more embodiments of the present disclosure, the determining the other frames having lost objects with respect to the object segmentation result of the reference frame among the at least some frames includes: performing, by using any other frame among the at least some frames as a current frame, object detection on the current frame to obtain an object candidate box set of the current frame; respectively matching at least one object candidate box comprised in an object detection box set of the current frame with the object subsequent box corresponding to the object segmentation result of the reference frame; and determining, according to the matching result, whether the current frame is one of the other frames having lost objects with respect to the object segmentation result of the reference frame.

According to one or more embodiments of the present disclosure, the matching at least one object candidate box comprised in an object detection box set with the object candidate box corresponding to the object segmentation result of the reference frame includes: separately performing feature extraction on the at least one object candidate box comprised in the object detection box set; and matching the features of the at least one object candidate box comprised in the object detection box set with the features of the object candidate box corresponding to the object segmentation result of the reference frame; the determining, according to the matching result, whether the current frame is one of the other frames having lost objects with respect to the object segmentation result of the reference frame includes: determining, according to the matching result, whether object candidate boxes that have a feature similarity of greater than a preset threshold and are inconsistent in corresponding object categories according to the object segmentation result exist in the at least one object candidate box comprised in the object detection box set and the object candidate box corresponding to the object segmentation result of the reference frame; responsive to determining that the object candidate boxes that have the feature similarity of greater than the preset threshold and are inconsistent in corresponding object categories according to the object segmentation result exist, determining that the current frame is one of the other frames having lost objects with respect to the object segmentation result of the reference frame; and responsive to determining that the object candidate boxes that have the feature similarity of greater than the preset threshold and are inconsistent in corresponding object categories according to the object segmentation result do not exist, determining that the current frame is not one of the other frames having lost objects with respect to the object segmentation result of the reference frame.

According to one or more embodiments of the present disclosure, the determining the other frames having lost objects with respect to the object segmentation result of the reference frame among the at least some frames includes: separately performing object detection on at least one other frame among the at least some frames to obtain an object candidate box set; matching at least one object candidate box comprised in an object detection box set with the object candidate box corresponding to the object segmentation result of the reference frame; and determining the other frames having lost objects with respect to the object segmentation result of the reference frame among the at least some frames according to the matching result.

According to one or more embodiments of the present disclosure, the matching the at least one object candidate box comprised in the object detection box set with the object candidate box corresponding to the object segmentation result of the reference frame includes: separately performing feature extraction on the at least one object candidate box comprised in the object detection box set; and matching the features of the at least one object candidate box comprised in the object detection box set with the features of the object candidate box corresponding to the object segmentation result of the reference frame; the determining the other frames having lost objects with respect to the object segmentation result of the reference frame among the at least some frames according to the matching result includes: obtaining, according to the matching result, object candidate boxes that have a feature similarity of greater than a preset threshold and are inconsistent in corresponding object categories according to the object segmentation result in the at least one object candidate box comprised in the object detection box set and the object candidate box corresponding to the object segmentation result of the reference frame; and obtaining the frames corresponding to the object candidate boxes in the object detection box set that have the feature similarity of greater than the preset threshold and are inconsistent in corresponding object categories according to the object segmentation result, as the other frames having lost objects with respect to the object segmentation result of the reference frame.

According to one or more embodiments of the present disclosure, the using the determined other frames as target frames includes: when the other frames having lost objects with respect to the object segmentation result of the reference frame among the at least some frames are plural, selecting one of the other frames having lost objects with respect to the object segmentation result of the reference frame as the target frame.

According to one or more embodiments of the present disclosure, the transferring the updated object segmentation results of the target frames to the at least one other frame in the video in sequence includes: obtaining consecutive frames in which the lost objects are lost among the at least some frames; and transferring the updated object segmentation results of the target frames to the at least one other frame among the consecutive frames in sequence.

According to one or more embodiments of the present disclosure, the at least one other frame includes: the first frame among the consecutive frames; and the transferring the updated object segmentation results of the target frames to the at least one other frame among the consecutive frames in sequence includes: transferring the updated object segmentation results of the target frames to the last frame among the consecutive frames in sequence in the forward timing direction among the consecutive frames; or the at least one other frame includes: the last frame among the consecutive frames; and the transferring the updated object segmentation results of the target frames to the at least one other frame among the consecutive frames in sequence includes: transferring the updated object segmentation results of the target frames to the first frame among the consecutive frames in sequence in the reverse timing direction among the consecutive frames; or the at least one other frame includes: a middle frame located between the first frame and the last frame among the consecutive frames; and the transferring the updated object segmentation results of the target frames to the at least one other frame among the consecutive frames in sequence includes at least one of the following: transferring the updated object segmentation results of the target frames to the last frame among the consecutive frames in sequence in the forward timing direction among the consecutive frames; or transferring the updated object segmentation results of the target frames to the first frame among the consecutive frames in sequence in the reverse timing direction among the consecutive frames.

A method for segmenting a video object provided according to another aspect of the embodiments of the present application, including: obtaining an image block including at least one object from a current frame in a video; obtaining a probability map block of an object category corresponding to the at least one object from an object category probability map of an adjacent frame of the current frame; and determining an object segmentation result of the at least one object in the current frame at least according to the image block and the probability map block.

According to one or more embodiments of the present disclosure, the adjacent frame of the current frame includes: a neighboring frame or a neighboring key frame of the current frame in the video in the forward timing direction or the reverse timing direction; wherein the determining the object segmentation result of the at least one object in the current frame at least according to the image block and the probability map block includes: separately zooming in the image block and the probability map block to a preset size; obtaining the object segmentation result of the at least one object in the current frame under the preset size according to the separately zoomed-in image block and probability map block; and restoring the object segmentation result of the at least one object under the preset size to the object segmentation result under an original size according to the zoom-in ratio of the image block and the probability map block.

According to one or more embodiments of the present disclosure, the method further includes: obtaining an optical flow map block corresponding to the at least one object according to an optical flow map between the adjacent frame and the current frame, wherein the determining the object segmentation result of the at least one object in the current frame at least according to the image block and the probability map block includes: determining the object segmentation result of the at least one object in the current frame according to the image block, the probability map block, and the optical flow map block.

According to one or more embodiments of the present disclosure, the determining the object segmentation result of the at least one object in the current frame according to the image block, the probability map block, and the optical flow map block includes: obtaining a first object segmentation result of the at least one object in the current frame according to the image block and the probability map block, and obtaining a second object segmentation result of the at least one object in the current frame according to the probability map block and the optical flow map block; and obtaining the object segmentation result of the at least one object in the current frame according to the first object segmentation result and the second object segmentation result; or, the determining the object segmentation result of the at least one object in the current frame according to the image block, the probability map block, and the optical flow map block includes: separately zooming in the image block, the probability map block, and the optical flow map block to a preset size; obtaining the object segmentation result of the at least one object in the current frame under the preset size according to the separately zoomed-in image block, probability map block, and optical flow map block; and restoring the object segmentation result of the at least one object under the preset size to the object segmentation result under an original size according to the zoom-in ratio of the image block, the probability map block, and the optical flow map block.

An apparatus for segmenting a video object provided according to another aspect of the embodiments of the present disclosure, including: a transfer network and an object re-identification network, wherein the transfer network is configured to perform, among at least some frames of a video, inter-frame transfer of an object segmentation result of a reference frame in sequence from the reference frame, to obtain an object segmentation result of at least one other frame among the at least some frames; and transfer updated object segmentation results of target frames obtained by the object re-identification network to the at least one other frame in the video in sequence; the object re-identification network is configured to determine other frames having lost objects with respect to the object segmentation result of the reference frame among the at least some frames; and use the determined other frames as the target frames to segment the lost objects, so as to update the object segmentation results of the target frames.

An apparatus for segmenting a video object provided according to another aspect of the embodiments of the present disclosure includes: a processor; and a memory having stored instructions and a neural network, the instructions when executed by the processor, cause the processor to perform operations according to the method for segmenting a video object.

A non-transitory computer storage medium provided according to another aspect of the embodiments of the present disclosure, has stored thereon computer-readable instructions executable by a processor, wherein the computer-readable instructions, when being executed, are configured to perform the operations of the method for segmenting a video object.

Based on a method and an apparatus for segmenting a video object segmentation, an electronic device, a storage medium, and a program provided in the embodiment of the present disclosure, among at least some frames of a video, inter-frame transfer of an object segmentation result of a reference frame is performed in sequence from the reference frame, to obtain an object segmentation result of at least one other frame among the at least some frames; other frames having lost objects with respect to the object segmentation result of the reference frame among the at least some frames are determined, and the determined other frames are used as target frames to segment the lost objects, so as to update the object segmentation results of the target frames; and the updated object segmentation results of the target frames are transferred to the at least one other frame in the video in sequence, so as to correct the object segmentation result of the at least one other frame. Based on this embodiment, the object segmentation result of the reference frame may be transferred to the other frames among the at least some frames of the video, to make the video object segmentation results more consecutive in timing; lost object segmentation is performed on the target frames having lost objects during transfer to update the object segmentation results of the target frames, and the updated object segmentation results of the target frames are transferred to the at least one other frame in the video in sequence, so as to correct the object segmentation results transferred to the other frames, so that the transfer failure of the object segmentation results due to large changes in covering and object pose, as well as the confusion or loss of some objects in the object segmentation results occurring after multiple objects move to overlap and then separate, can be improved, and the accuracy of the video object segmentation results is increased.

Based on another method and apparatus for segmenting a video object, another electronic device, another storage medium, and another program provided in the embodiment of the present disclosure, an image block including at least one object is obtained from a current frame in a video, and a probability map block of an object category corresponding to the at least one object is obtained from an object category probability map of an adjacent frame of the current frame; and the object segmentation result of the at least one object in the current frame is determined at least according to the image block and the probability map block. In this embodiment of the present disclosure, by determining the object segmentation result of the at least one object in the current frame based on the image block including the object in the current frame, small-sized objects and detailed information in images can be effectively captured, and background noise interference in the images can be reduced, and therefore, the transfer failure of the object segmentation results due to the small size and the large size change of any object in the frames is improved, and the accuracy of the video object segmentation results is increased.

The following further describes in detail the technical solutions of the present disclosure with reference to the accompanying drawings and embodiments.

BRIEF DESCRIPTION OF THE DRAWINGS

The accompanying drawings constituting a part of the specification are used for describing embodiments of the present disclosure and are intended to explain the principles of the present disclosure together with the descriptions. According to the following detailed descriptions, the present disclosure can be understood more clearly with reference to the accompanying drawings.

DETAILED DESCRIPTION

Figure 1:
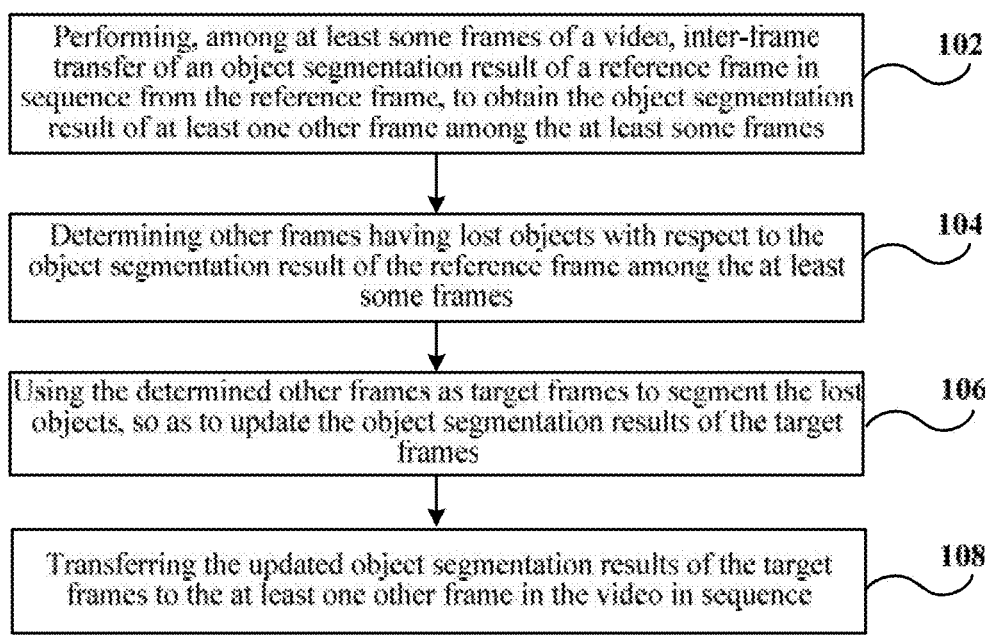
FIG. 1 is a flowchart of an embodiment of a method for segmenting a video object according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to persons of ordinary skill in the related art may not be discussed in detail, but such technologies, methods and devices should be considered as a part of the specification in appropriate situations.

Persons skilled in the art can understand that the terms "first," "second" and the like in the embodiments of the present disclosure are only used to distinguish different steps, devices or modules, etc., and do not represent any specific technical meaning or inevitable logical sequence therebetween.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like. For the term "and/or" throughout the present disclosure, the symbol "/" refers to "or," for example, "A and/or B" including "A," "B," and "A and B."

The electronic devices such as terminal devices, computer systems, and servers may be described in the general context of computer system executable instructions (such as, program modules) executed by the computer system. Generally, the program modules may include routines, programs, target programs, assemblies, logics, data structures, and the like, to perform specific tasks or implement specific abstract data types. The computer system/server may be practiced in the distributed cloud computing environments in which tasks are performed by remote processing devices that are linked through a communications network. In the distributed computing environments, program modules may be located in local or remote computing system storage medium including storage devices.

FIG. 1 is a flowchart of an embodiment of a method for segmenting a video object according to the present disclosure. As shown in FIG. 1, the method for segmenting a video object of this embodiment includes:

102: in at least some frames of a video, inter-frame transfer of an object segmentation result of a reference frame is performed in sequence from the reference frame, to obtain an object segmentation result of at least one other frame among the at least some frames, for example, the object segmentation results of other frames than the reference frame in the at least some frames are obtained.

The frames in any one of the embodiments of the present disclosure are image frames. According to application requirements, the at least some frames may be frames in the entire video, and may also be frames included in a certain video segment of the video or a set of frames extracted from the video at least every one frame, and video object segmentation may be performed thereon by applying the embodiments of the present disclosure.

In one of optional examples, the reference frame may be the first frame among the at least some frames. Accordingly, in operation 102, inter-frame transfer is performed on the object segmentation result of the first frame in a forward timing direction among the at least some frames till the last frame among the at least some frames.

In another optional example, the reference frame may be the last frame among the at least some frames. Accordingly, in operation 102, inter-frame transfer is performed on the object segmentation result of the last frame in a reverse timing direction among the at least some frames till the first frame among the at least some frames.

In still another example, the reference frame may be a middle frame located between the first frame and the last frame among the at least some frames. Accordingly, in operation 102, inter-frame transfer is performed on the object segmentation result of the middle frame in the forward timing direction among the at least some frames till the last frame among the at least some frames; and/or inter-frame transfer is performed on the object segmentation result of the middle frame in the reverse timing direction among the at least some frames till the first frame among the at least some frames.

In an optional example of any embodiment of the present disclosure, the object segmentation results may be represented as probability maps of objects. In the example, the object segmentation result of each frame may be represented as a probability map, and the value of each pixel in the probability map indicates the object category of the object in the frame corresponding to the pixel. In addition, the object segmentation result of each frame may also be represented as multiple probability maps, and each probability map respectively represents a probability map of an object category in the frame. In each probability map, the object category of the object in the frame corresponding to each pixel is the object category represented by the probability map, and the value of the pixel point may be 1; otherwise, the object category of the object in the frame corresponding to each pixel is not the object category represented by the probability map, and the value of the pixel point may be 0.

In an optional example, operation 102 may be executed by a processor by invoking a corresponding instruction stored in a memory, or may be executed by a transfer network 502 run by the processor.

104: Other frames having lost objects with respect to the object segmentation result of the reference frame among the at least some frames are determined.

In an optional example, operation 104 may be executed by a processor by invoking a corresponding instruction stored in a memory, or may be executed by an object re-identification network 504 run by the processor.

106: The determined other frames are used as target frames to segment the lost objects, so as to update the object segmentation results of the target frames.

The target frame may be one or more frames in the other frames having lost objects with respect to the object segmentation result of the reference frame among the at least some frames.

In an optional example, operation 106 may be executed by a processor by invoking a corresponding instruction stored in a memory, or may be executed by an object re-identification network 504 run by the processor.

108. The updated object segmentation results of the target frames are transferred to the at least one other frame in the video in sequence.

In an optional example, operation 108 may be executed by a processor by invoking a corresponding instruction stored in a memory, or may be executed by a transfer network 502 run by the processor.

In the embodiments of the present disclosure, operations 104-108 may be executed once, and may also be executed multiple times in a loop, until there are no other frames having lost objects with respect to the object segmentation result of the reference frame among the at least some frames. Operations 102 and 108 may be separately regarded as a propagation process of an object segmentation result, and operations 104 and 106 may be regarded as an object re-identification process. That is, in the embodiments of the present disclosure, operations 104-108 may be regarded as a cyclic process in which the propagation process of the object segmentation result alternates with the object re-identification process. In the cyclic process, the target frame in operation 108 may be used as the reference frame, and the updated object segmentation result of the target frame may be used as the object segmentation result of the reference frame, thereby performing inter-frame transfer in the video or among the at least some frames.

Based on this embodiment, the object segmentation result of the reference frame may be transferred to the other frames among the at least some frames of the video, to make the video object segmentation results more consecutive in timing; lost object segmentation is performed on the target frames having lost objects during transfer to update the object segmentation results of the target frames, and the updated object segmentation results of the target frames are transferred to the at least one other frame in the video in sequence, so as to correct the object segmentation results transferred to the other frames, so that the transfer failure of the object segmentation results due to large changes in covering and object pose, as well as the confusion or loss of some objects in the object segmentation results occurring after multiple objects move to overlap and then separate, can be improved, and the accuracy of the video object segmentation results is increased.

In yet another example of the embodiment shown in FIG. 1, in operation 102, the performing inter-frame transfer of an object segmentation result of a reference frame in sequence from the reference frame, to obtain an object segmentation result of at least one other frame among the at least some frames may be implemented in the following mode:

determining, according to the object segmentation result of a preceding frame in a propagation direction of the object segmentation result of the reference frame, the object segmentation result of a succeeding frame in the propagation direction, where the propagation direction includes the forward timing direction and/or the reverse timing frame of the video.

In the embodiments of the present disclosure, the preceding frame and the succeeding frame are relative to the order in the propagation direction and are thus of relativity. The propagation direction may be the forward timing direction or the reverse timing direction of the video. The frame which precedes in order in the propagation direction is the preceding frame, and the frame which follows in order in the propagation direction is the succeeding frame. For example, the preceding frame may be a neighboring frame or a neighboring key frame of the succeeding frame in the forward timing direction or the reverse timing direction among the at least some frames, where the key frame may be a frame that is spaced apart from the succeeding frame within a preset frame number range in the forward timing direction or the reverse timing frame among the at least some frames. When the propagation direction is changed, the preceding frame and the succeeding frame are changed accordingly.

Further exemplarily, the determining, according to the object segmentation result of a preceding frame in a propagation direction of the object segmentation result of the reference frame, the object segmentation result of a succeeding frame in the propagation direction may be implemented by using a transfer network to execute the following operations:

obtaining an image block including at least one object from the succeeding frame; obtaining a probability map block of an object category respectively corresponding to the at least one object from an object category probability map of the preceding frame; and determining the object segmentation result of the at least one object in the succeeding frame at least according to the image block and the probability map block.

In a further optional example of the embodiments of the present disclosure, the size of the extracted image block including the object may be greater than that of an object candidate box of the object and less than the image size of the succeeding frame, so that more context information can be extracted when subsequently extracting features from the image block, thereby facilitating obtaining the object segmentation result of the object more accurately.

In one of optional examples, the determining the object segmentation result of the object in the succeeding frame at least according to the image block and the probability map block may be implemented by using a transfer network to execute the following operations:

separately zooming in the image block and the probability map block to a preset size;

obtaining the object segmentation result of the at least one object in the succeeding frame under the preset size according to the separately zoomed-in image block and probability map block; and restoring the object segmentation result of the at least one object under the preset size to the object segmentation result under an original size according to the zoom-in ratio of the image block and the probability map block, i.e., zooming out the object segmentation result of the at least one object under the preset size in a ratio relative to the zoom-in ratio, to obtain the object segmentation result of the at least one object.

In another optional example, the determining, according to the object segmentation result of a preceding frame in a propagation direction of the object segmentation result of the reference frame, the object segmentation result of a succeeding frame in the propagation direction may further include: obtaining an optical flow map block corresponding to the at least one object according to an optical flow map between the preceding frame and the succeeding frame. The optical flow map between the preceding frame and the succeeding frame may be obtained by means of an optional flow network.

Accordingly, in the optional example, the determining the object segmentation result of the at least one object in the succeeding frame at least according to the image block and the probability map block may be implemented by a transfer network by executing the following operation: obtaining the object segmentation result of the at least one object in the succeeding frame according to the image block, the probability map block, and the optical flow map block.

The obtaining the object segmentation result of the at least one object in the succeeding frame according to the image block, the probability map block, and the optical flow map block may be exemplarily implemented in the following mode:

obtaining a first object segmentation result of the at least one object in the succeeding frame according to the image block and the probability map block, where the operation may be implemented by a first neural network in the transfer network; and obtaining a second object segmentation result of the at least one object in the succeeding frame according to the probability map block and the optical flow map block, where the operation may be implemented by a second neural network in the transfer network; and obtaining the object segmentation result of the at least one object in the succeeding frame according to the first object segmentation result and the second object segmentation result, where the operation may be implemented by a computing module in the transfer network. For example, the sum of the first object segmentation result and the second object segmentation result is obtained as the object segmentation result of the at least one object in the succeeding frame; alternatively, the average value of the first object segmentation result and the second object segmentation result is obtained as the object segmentation result of the at least one object in the succeeding frame.

In addition, the determining the object segmentation result of the at least one object in the succeeding frame according to the image block, the probability map block, and the optical flow map block may be implemented by the transfer network by executing the following operations:

separately zooming in the image block, the probability map block, and the optical flow map block to a preset size, where the operation is implemented by a first zooming unit in the transfer network;

obtaining the object segmentation result of the at least one object in the succeeding frame under the preset size according to the separately zoomed-in image block, probability map block, and optical flow map block; and restoring the object segmentation result of the at least one object under the preset size to the object segmentation result under an original size according to the zoom-in ratio of the image block, the probability map block, and the optical flow map block, i.e., zooming out the object segmentation result of the at least one object under the preset size in a ratio relative to the zoom-in ratio, to obtain the object segmentation result of the at least one object. The operation may be implemented by a second zooming unit in the transfer network.

The obtaining the object segmentation result of the at least one object in the succeeding frame under the preset size according to the separately zoomed-in image block, probability map block, and optical flow map block may be exemplarily implemented in the following mode:

for example, obtaining, by using the first neural network in the transfer network, a third object segmentation result of the at least one object in the succeeding frame according to the separately zoomed-in image block and probability map block; and for example, obtaining, by using the second neural network in the transfer network, a fourth object segmentation result of the at least one object in the succeeding frame according to the separately zoomed-in probability map block and optical flow map block; and for example, determining, by using the computing module in the transfer network, the object segmentation result of the at least one object in the succeeding frame under the preset size according to the third object segmentation result and the fourth object segmentation result.

A deep residual network has the function of extracting strong discriminative features. In one of the examples of any method embodiment of the present disclosure, the first neural network and the second neural network may be implemented using the deep residual network.

The inventors have found through investigation that the deep residual network usually has 101 network layers, and thus can be called a 101-layer deep residual network. In addition, the deep residual network may also have more network layers. The more the network layers of the deep residual network, the higher the precision of the output result, but the more the required computing time and occupied memory resources. The 101-layer deep residual network can achieve a better balance point in output result precision, time complexity, and space complexity. The probability map block output by a common 101-layer deep residual network is 2048 channels. The size of the probability map block is $\frac{1}{224}$ of the original image size, i.e., the size of the probability map block is 1*1. To improve the precision of the probability map block, in the embodiments of the present disclosure, a deep residual network having more network layers, such as a first convolutional neural network and a second convolutional neural network, may be employed. In addition, in order to increase the size of the output probability map block and better capture the detailed information in the image, the 101-layer deep residual network may be implemented by making the following improvements: reducing the convolutional step size of a convolutional layer in the 101-layer deep residual network, and expanding the convolution kernel to increase the convolution kernel size.

Furthermore, in each of the foregoing embodiments of the method for segmenting a video object according to the present disclosure, operation 104 may be implemented in the following mode:

performing, by using any other frame among the at least some frames as a current frame, object detection on the current frame to obtain an object candidate box set of the current frame, where each frame corresponds to a candidate set configured to store all the object candidate boxes in the frame;

respectively matching at least one object candidate box (such as, each object candidate box) included in an object detection box set of the current frame with the object subsequent box corresponding to the object segmentation result of the reference frame; and determining, according to the matching result, whether the current frame is one of the other frames having lost objects with respect to the object segmentation result of the reference frame.

In one of optional examples, the matching each object candidate box included in an object detection box set of the current frame with the object candidate box corresponding to the object segmentation result of the reference frame may include: separately performing feature extraction on each object candidate box included in the object detection box set of the current frame; and matching the features of each object candidate box included in the object detection box set with the features of the object candidate box corresponding to the object segmentation result of the reference frame.

Accordingly, the determining, according to the matching result, whether the current frame is one of the other frames having lost objects with respect to the object segmentation result of the reference frame, may include: determining, according to the matching result, whether object candidate boxes that have a feature similarity of greater than a preset threshold and are inconsistent in corresponding object categories according to the object segmentation result exist in the at least one object candidate box included in the object detection box set and the object candidate box corresponding to the object segmentation result of the reference frame; if the object candidate boxes that have the feature similarity of greater than the preset threshold and are inconsistent in corresponding object categories according to the object segmentation result exist, determining that the current frame is one of the other frames having lost objects with respect to the object segmentation result of the reference frame; otherwise, determining that the current frame is not one of the other frames having lost objects with respect to the object segmentation result of the reference frame.

Alternatively, in each of the foregoing embodiments of the method for segmenting a video object according to the present disclosure, operation 104 may be implemented in the following mode:

separately performing object detection on at least one other frame among the at least some frames to obtain an object candidate box set;

matching at least one object candidate box (such as, each object candidate box) included in the object detection box set with the object candidate box corresponding to the object segmentation result of the reference frame; and determining the other frames having lost objects with respect to the object segmentation result of the reference frame among the at least some frames according to the matching result.

In one of optional examples, the matching at least one object candidate box included in the object detection box set with the object candidate box corresponding to the object segmentation result of the reference frame may include: separately performing feature extraction on the at least one object candidate box included in the object detection box set; and matching the features of the at least one object candidate box included in the object detection box set with the features of the object candidate box corresponding to the object segmentation result of the reference frame.

Accordingly, the determining the other frames having lost objects with respect to the object segmentation result of the reference frame among the at least some frames according to the matching result may include:

obtaining, according to the matching result, object candidate boxes that have a feature similarity of greater than a preset threshold and are inconsistent in corresponding object categories according to the object segmentation result in the at least one object candidate box (such as, each object candidate box) included in the object detection box set and the object candidate box corresponding to the object segmentation result of the reference frame; and obtaining the frames corresponding to the object candidate boxes in the object detection box set that have the feature similarity of greater than the preset threshold and are inconsistent in corresponding object categories according to the object segmentation result, as the other frames having lost objects with respect to the object segmentation result of the reference frame.

Accordingly, when using the determined other frames are used as the target frames, operation 106 may include:

if the other frames having lost objects with respect to the object segmentation result of the reference frame among the at least some frames are plural, selecting one of the other frames having lost objects with respect to the object segmentation result of the reference frame as the target frame according to a preset policy.

For example, one other frame is randomly selected as the target frame from the other frames having lost objects with respect to the object segmentation result of the reference frame; alternatively, one other frame where the object candidate box that has the highest feature similarity to the object candidate box corresponding to the object segmentation result of the reference frame and is inconsistent with the same in the corresponding object category according to the object segmentation result is located is selected from the object candidate boxes included in the object detection box set as the target frame.

In addition, in each of the foregoing embodiments of the method for segmenting a video object according to the present disclosure, operation 108 may include:

obtaining consecutive frames in which the lost objects are lost among the at least some frames; and transferring the updated object segmentation results of the target frames to the at least one other frame among the consecutive frames in sequence.

Exemplarily, the at least one other frame may be the first frame among the consecutive frames. Accordingly, when transferring the updated object segmentation results of the target frames to the at least one other frame among the consecutive frames in sequence, the updated object segmentation results of the target frames may be transferred to the last frame among the consecutive frames in sequence in the forward timing direction among the consecutive frames.

Alternatively, the at least one other frame may also be the last frame among the consecutive frames. Accordingly, when transferring the updated object segmentation results of the target frames to the at least one other frame among the consecutive frames in sequence, the updated object segmentation results of the target frames may be transferred to the first frame among the consecutive frames in sequence in the reverse timing direction among the consecutive frames.

Alternatively, the at least one other frame may also be a middle frame located between the first frame and the last frame among the consecutive frames. Accordingly, when transferring the updated object segmentation results of the target frames to the at least one other frame among the consecutive frames in sequence, the updated object segmentation results of the target frames may be transferred to the last frame among the consecutive frames in sequence in the forward timing direction among the consecutive frames; and/or the updated object segmentation results of the target frames may be transferred to the first frame among the consecutive frames in sequence in the reverse timing direction among the consecutive frames.

In addition, in an optional example of any one of the foregoing embodiments of the method for segmenting a video object according to the present disclosure, for the same lost object, the other frames to which the updated object segmentation results of the target frames are transferred this time do not overlap the other frames to which the updated object segmentation results of the target frames are transferred previously in range.

In one of optional examples, each time when transferring the updated object segmentation results of the target frames to the at least one other frame in the video in sequence, the object information of the lost object and the frame numbers of the other frames to which the updated object segmentation results of the target frames are transferred may be recorded in a correction information table. The object information may be object features, object categories, or the like.

Each time when transferring the updated object segmentation results of the target frames to the at least one other frame in the video in sequence, it is possible to query whether the correction information table includes the object information of the lost object.

If the correction information table includes the object information of the lost object, it indicates that the object segmentation result of the lost object has been corrected before, the frame numbers corresponding to the object information of the lost object in the correction information table is queried, to obtain the other frames in the video to which the updated object segmentation results of the target frames are transferred previously based on the object segmentation result of the lost object, whereby determining the other frame in the video to which the updated object segmentation results of the target frames are transferred previously in sequence, so as to ensure that the other frames determined this time do that repeat the other frames corresponding to the queried frame numbers.

For example, previously, for the lost object, the updated object segmentation results of the target frames are transferred to the $21^{st}$ frame through the $23^{rd}$ frame in the video in sequence. When continuing to transfer the object segmentation results for the lost object this time, even if the obtained frames in which the lost object is lost in the video are the $20^{th}$ frame through the $27^{th}$ frame, since the object segmentation results of the $21^{th}$ frame through the $23^{rd}$ frame have been corrected based on the lost object last time, the updated object segmentation results of the target frames may be transferred to the $24^{th}$ frame through the $27^{th}$ frame in the video this time.

Based on this embodiment, re-correction of the object segmentation results corrected in the previous round during an object segmentation result transfer process of the next round for the same lost object can be avoided, thereby leading to an infinite loop of the process in the embodiments of the present disclosure. Moreover, long-distance transfer of the object segmentation results may result in poor accuracy of the object segmentation results. Based on this embodiment, correcting relatively accurate object segmentation results on a certain frame by using the object segmentation results with relatively poor accuracy resulting from the long-distance transfer can be avoided, thereby effectively ensure the accuracy of the object segmentation results.

Figure 2:
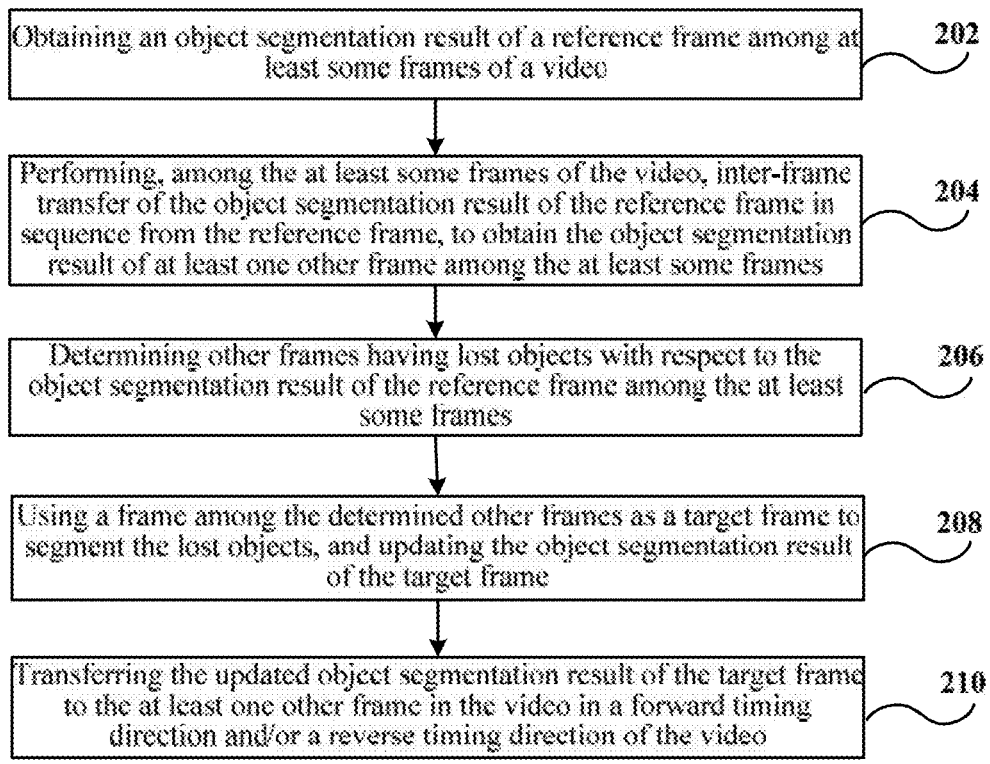
FIG. 2 is a flowchart of another embodiment of a method for segmenting a video object according to the present disclosure.

FIG. 2 is a flowchart of another embodiment of a method for segmenting a video object according to the present disclosure. As shown in FIG. 2, the method for segmenting a video object of this embodiment includes:

202: an object segmentation result of a reference frame among at least some frames of a video is obtained.

As an optional implementation of the embodiments of the present disclosure, operation 202 may be: receiving the object segmentation result of the reference frame, where the object segmentation result of the reference frame may be obtained in advance.

In addition, as another optional implementation of the embodiments of the present disclosure, operation 202 may also be implemented through the following method for segmenting an image object: performing object segmentation on the reference frame to obtain the object segmentation result of the reference frame.

For example, it is possible to perform object segmentation on the reference frame in the following mode to obtain the object segmentation result of the reference frame:

feature extraction is performed on the reference frame to obtain features of the reference frame. Exemplarily, the features of the reference frame may be, for example, represented as a feature vector or characteristic diagram.

The object category of each pixel in the reference frame is predicted according to the features to obtain the object segmentation result of the reference frame.

In an optional example, operation 202 may be executed by a processor by invoking a corresponding instruction stored in a memory, or may be executed by a transfer network 502 run by the processor.

204: Among at least some frames of a video, inter-frame transfer of the object segmentation result of the reference frame is performed in sequence from the reference frame, to obtain an object segmentation result of at least one other frame among the at least some frames.

According to one or more embodiments of the present disclosure, among the at least some frames, according to the object segmentation result of a preceding frame in a propagation direction of the object segmentation result of the reference frame, the object segmentation result of a succeeding frame in the propagation direction may be determined, where the propagation direction includes a forward timing direction and/or a reverse timing frame of the video.

In the embodiments of the present disclosure, the preceding frame and the succeeding frame are relative to the order in the propagation direction and are thus of relativity. The propagation direction may be the forward timing direction or the reverse timing direction of the video. The frame which precedes in order in the propagation direction is the preceding frame, and the frame which follows in order in the propagation direction is the succeeding frame. For example, the preceding frame may be a neighboring frame or a neighboring key frame of the succeeding frame in the forward timing direction or the reverse timing direction among the at least some frames, where the key frame may be a frame that is spaced apart from the succeeding frame within a preset frame number range in the forward timing direction or the reverse timing frame among the at least some frames. When the propagation direction is changed, the preceding frame and the succeeding frame are changed accordingly.

According to application requirements, the at least some frames may be frames in the entire video, and may also be frames included in a certain video segment of the video or a set of frames extracted from the video at least every one frame, and video object segmentation may be performed thereon by applying the embodiments of the present disclosure.

Operation 204 may be referred to as the propagation process of the object segmentation result.

In an optional example, operation 204 may be executed by a processor by invoking a corresponding instruction stored in a memory, or may be executed by a transfer network 502 run by the processor.

206: Other frames having lost objects with respect to the object segmentation result of the reference frame among the at least some frames are determined.

208: A frame among the determined other frames is used as a target frame to segment the lost objects, and the object segmentation result of the target frame is updated.

Operations 206-208 may be referred to as an object re-identification process.

In an optional example, operations 206-208 may be executed by a processor by invoking a corresponding instruction stored in a memory, or may be executed by an object re-identification network 504 run by the processor.

210: The updated object segmentation result of the target frame is transferred to the at least one other frame in the video in the forward timing direction and/or the reverse timing direction of the video, the target frame is used as the reference frame, and the updated object segmentation result of the target frame is updated to the object segmentation result of each frame among the succeeding frame of the target frame to the at least one other frame in the propagation direction of the object segmentation result.

Operation 210 may be referred to as the propagation process of the object segmentation result.

In an optional example, operation 210 may be executed by a processor by invoking a corresponding instruction stored in a memory, or may be executed by a transfer network 502 run by the processor.

Afterwards, operation 206 is executed again until there are no other frames having lost objects with respect to the object segmentation result of the reference frame among the at least some frames.

Figure 3:
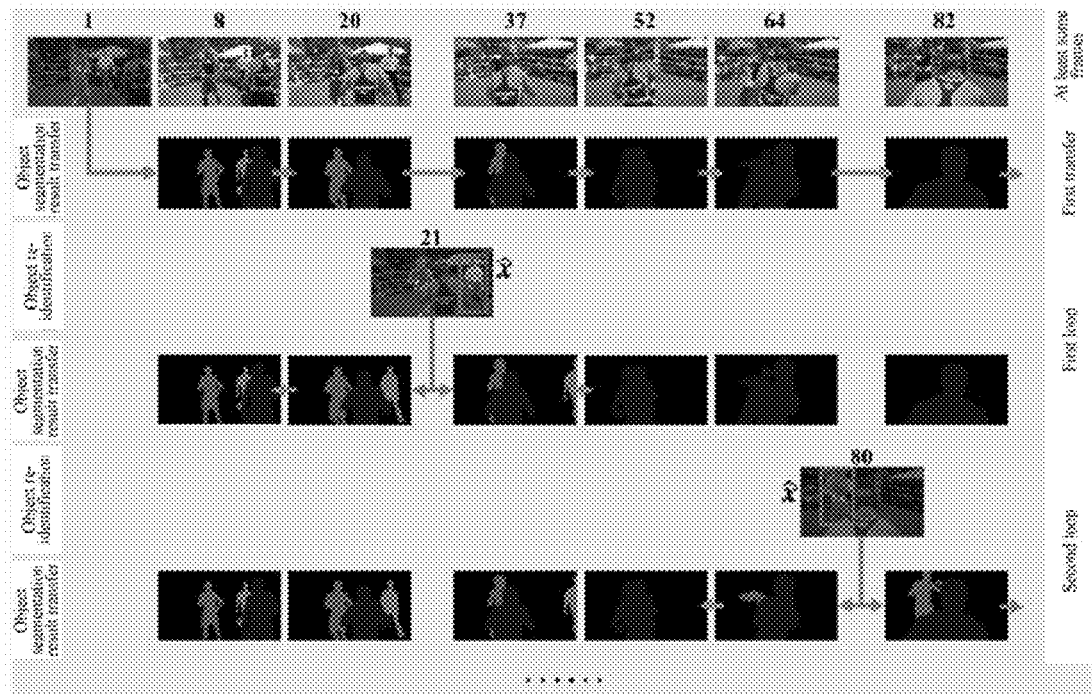
FIG. 3 is a schematic diagram of a process of segmenting objects in a video by applying an embodiment of a method for segmenting a video object according to the present disclosure.

FIG. 3 is a schematic diagram of a process of segmenting objects in a video by applying an embodiment of a method for segmenting a video object according to the present disclosure. As shown in FIG. 3, pictures shown in the first line are at least some frames in a video, which includes 82 image frames. The first line in FIG. 3 exemplarily indicates the frame numbers of the first, eighth, twentieth, thirty-seventh, fifty-second, sixty-fourth, and eighty-second frames. Assuming that the first frame is the reference frame, the object segmentation result thereof can be obtained in advance, for example, the result is obtained manually or through a method for segmenting an image object.

In step 1, from the first frame, inter-frame transfer is performed on a segmentation result of the first frame in a forward timing direction of a video until the segmentation result is transferred to the last frame, i.e., the eighty-second frame. Please refer to the pictures in the second line.

In step 2, other frames having lost objects with respect to the object segmentation result of the first frame are determined in the process of transferring the segmentation result of the object of the first frame to the eighty-second frame, where it is assumed that the other frames include the sixteenth to thirty-sixth frames.

In step 3, the twenty-first frame is selected as a target frame to segment the lost objects, and the object segmentation result of the target frame is updated according to the segmentation result of the lost objects. Please refer to the picture in the third line.

In step 4, the twenty-first frame is used as the reference frame, inter-frame transfer is performed on the updated object segmentation result of the twenty-first frame in the forward timing direction and the reverse timing direction of the video separately, so as to update the object segmentation results of adjacent frames of the twenty-first frame in the forward timing direction and the reverse timing direction of the video, and retrieve the segmentation results of the lost objects in these adjacent frames. Please refer to pictures in the fourth line.

Afterwards, go back to re-execute steps 2 through 4:

Other frames having lost objects with respect to the object segmentation result of the first frame are determined in the process of transferring the segmentation result of the object of the first frame to the eighty-second frame, where it is assumed that the other frames include the sixtieth to eighty-sixth frames.

The eightieth frame is selected as a target frame to segment the lost objects, and the object segmentation result of the target frame is updated according to the segmentation result of the lost objects. Please refer to the picture in the fifth line.

The eightieth frame is used as the reference frame, inter-frame transfer is performed on the updated object segmentation result of the eightieth frame in the forward timing direction and the reverse timing direction of the video separately, so as to update the object segmentation results of adjacent frames of the eightieth frame in the forward timing direction and the reverse timing direction of the video, and retrieve the segmentation results of the lost objects in these adjacent frames. Please refer to pictures in the sixth line.

Afterwards, go back to re-execute steps 2 through 4 until there are no other frames having lost objects with respect to the object segmentation result of the first frame among the at least some frames.

Figure 4:
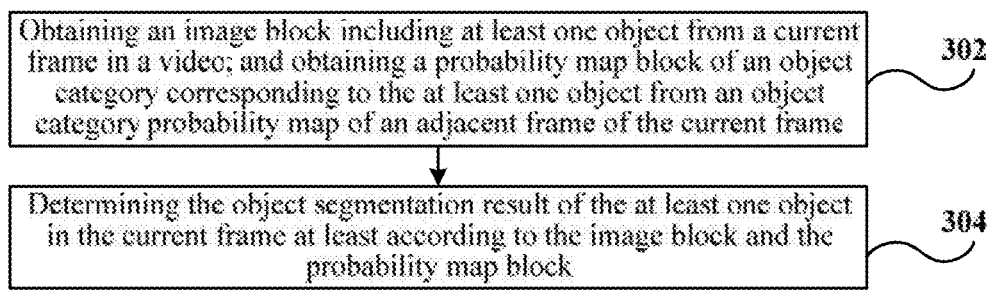
FIG. 4 is a flowchart of still another embodiment of a method for segmenting a video object according to the present disclosure.

FIG. 4 is a flowchart of still another embodiment of a method for segmenting a video object according to the present disclosure. This embodiment can be exemplarily implemented by a transfer network. As shown in FIG. 4, the method for segmenting a video object of this embodiment includes:

302: an image block including at least one object (i.e., one object or multiple objects) is obtained from a current frame in a video; and a probability map block of an object category corresponding to the at least one object is obtained from an object category probability map of an adjacent frame of the current frame.

In an optional example, operation 302 may be performed by a processor by invoking a corresponding instruction stored in a memory, and may also be performed by a first obtaining module 602 run by the processor.

304: The object segmentation result of the at least one object in the current frame is determined at least according to the image block and the probability map block.

In an optional example, operation 304 may be performed by a processor by invoking a corresponding instruction stored in a memory, and may also be performed by a determining module 604 run by the processor.

In this embodiment of the present disclosure, by determining the object segmentation result of the at least one object in the current frame based on the image block including the object in the current frame, small-sized objects and detailed information in images can be effectively captured, and background noise interference in the images can be reduced, and therefore, the transfer failure of the object segmentation results due to the small size and the large size change of any object in the frames is improved, and the accuracy of the video object segmentation results is increased.

In one of optional examples, operation 304 may include:

separately zooming in the image block and the probability map block to a preset size;

obtaining the object segmentation result of the at least one object in the current frame under the preset size according to the separately zoomed-in image block and probability map block; and restoring the object segmentation result of the at least one object under the preset size to the object segmentation result under an original size according to the zoom-in ratio of the image block and the probability map block.

In another optional example, operation 302 may further include: obtaining an optical flow map block corresponding to the object according to an optical flow map between the adjacent frame and the current frame. Accordingly, operation 304 may include: determining the object segmentation result of the object in the current frame according to the image block, the probability map block, and the optical flow map block.

In a further example, the obtaining the object segmentation result of the at least one object in the current frame according to the image block, the probability map block, and the optical flow map block may be exemplarily implemented in the following mode:

for example, obtaining, by using the first neural network in the transfer network, a first object segmentation result of the at least one object in the current frame according to the image block and probability map block; and for example, obtaining, by using the second neural network in the transfer network, a second object segmentation result of the at least one object in the current frame according to the probability map block and optical flow map block; and obtaining, by a computing module in the transfer network, the object segmentation result of the at least one object in the current frame according to the first object segmentation result and the second object segmentation result.

Alternatively, in a further example, the obtaining the object segmentation result of the at least one object in the current frame according to the image block, the probability map block, and the optical flow map block may be exemplarily implemented in the following mode:

separately zooming in, by a first zooming unit in the transfer network, the image block, the probability map block, and the optical flow map block to a preset size; and obtaining the object segmentation result of the at least one object in the current frame under the preset size according to the separately zoomed-in image block, probability map block, and optical flow map block. For example, a third object segmentation result of the object in the current frame is obtained by the first neural network in the transfer network according to the separately zoomed-in image block and probability map block; and for example, a fourth object segmentation result of the at least one object in the current frame is obtained by the second neural network in the transfer network according to the separately zoomed-in probability map block and optical flow map block; and the object segmentation result of the at least one object in the current frame under the preset size is determined by the computing module in the transfer network according to the third object segmentation result and the fourth object segmentation result.

For example, the object segmentation result of the at least one object under the preset size is restored by a second zooming unit in the transfer network to the object segmentation result under the original size according to the zoom-in ratio of the image block, the probability map block, and the optical flow map block.

The current frame and the adjacent frame are relative to the order in the propagation direction and are thus of relativity. The propagation direction may be the forward timing direction or the reverse timing direction of the video. The frame which precedes in order in the propagation direction is the adjacent frame, and the frame which follows in order in the propagation direction is the current frame. For example, the adjacent frame may be a neighboring frame or a neighboring key frame of the current frame in the video in the forward timing direction or the reverse timing direction, where the adjacent frame may be a frame that is spaced apart from the current frame within a preset frame number range in the forward timing direction or the reverse timing frame in the video. When the propagation direction is changed, the adjacent frame and the current frame are changed accordingly.

In addition, In operation 302 of any one of the foregoing embodiments, the size of the image block of the object obtained from the current frame may be greater than that of an object candidate box of the at least one object, so that more context information can be extracted when subsequently extracting features from the image block, thereby facilitating obtaining the object segmentation result of the at least one object more accurately.

Figure 5:
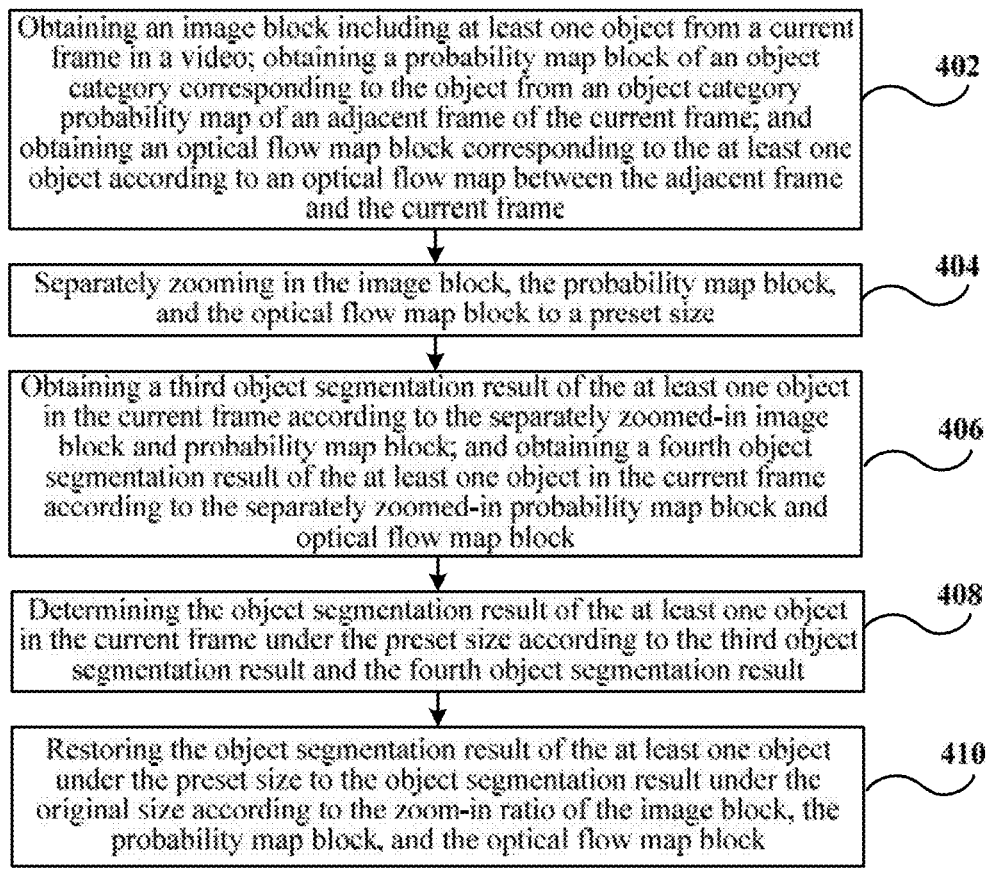
FIG. 5 is a flowchart of yet another embodiment of a method for segmenting a video object according to the present disclosure.

FIG. 5 is a flowchart of yet another embodiment of a method for segmenting a video object according to the present disclosure. As shown in FIG. 5, the method for segmenting a video object of this embodiment includes:

402: an image block including at least one object is obtained from a current frame in a video; a probability map block of an object category corresponding to the at least one object is obtained from an object category probability map of an adjacent frame of the current frame; and an optical flow map block corresponding to the at least one object is obtained according to an optical flow map between the adjacent frame and the current frame.

In an optional example, operation 402 may be performed by a processor by invoking a corresponding instruction stored in a memory, and may also be performed by a first obtaining module 602 run by the processor.

404: The image block, the probability map block, and the optical flow map block are separately zoomed in by a first zooming unit in a transfer network to the preset size.

In an optional example, operation 404 may be executed by a processor by invoking a corresponding instruction stored in a memory, or may be executed by a first zooming unit 702 run by the processor.

406: A third object segmentation result of the at least one object in the current frame is obtained by a first neural network in the transfer network according to the separately zoomed-in image block and probability map block; and a fourth object segmentation result of the at least one object in the current frame is obtained by a second neural network in the transfer network according to the separately zoomed-in probability map block and optical flow map block.

In an optional example, operation 406 may be executed by a processor by invoking a corresponding instruction stored in a memory, or may be separately executed by a first neural network 704 and a second neural network 708 run by the processor.

408: The object segmentation result of the at least one object in the current frame under the preset size is determined by a computing module in the transfer network according to the third object segmentation result and the fourth object segmentation result.

In an optional example, the operation 408 may be executed by a processor by invoking a corresponding instruction stored in a memory, or may be executed by a computing unit 710 run by the processor.

410: The object segmentation result of the at least one object under the preset size is restored by a second zooming unit in the transfer network to the object segmentation result under the original size according to the zoom-in ratio of the image block, the probability map block, and the optical flow map block.

In an optional example, operation 408 may be executed by a processor by invoking a corresponding instruction stored in a memory, or may be executed by a second zooming unit 706 run by the processor.

In the embodiments of the present disclosure, by obtaining the object segmentation result of the current frame based on the image block of an object zoomed-in to the preset size extracted from the current frame and the optical flow map and the probability map block of the object zoomed-in to the preset size extracted from the adjacent frame, small-sized objects and detailed information in images can be effectively captured, and the object segmentation result of the current frame can be obtained more accurately, so that inter-frame transfer of the object segmentation result is implemented, the transfer failure of the object segmentation results due to the small size, the large size change and the like of any object in the frames is improved, and the accuracy of the video object segmentation results is increased.

Figure 6:
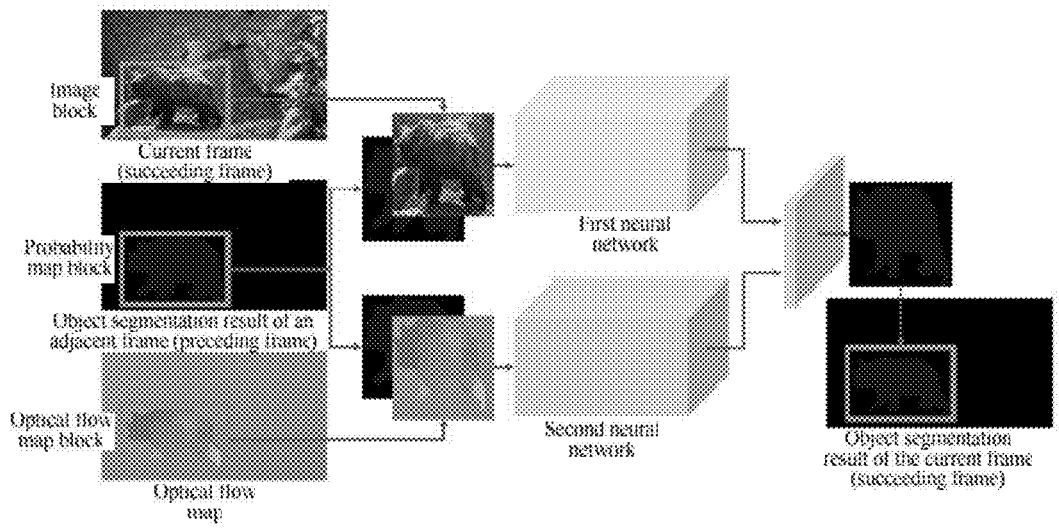
FIG. 6 is an illustrative diagram of performing inter-frame transfer on object segmentation results in an embodiment of the present disclosure.

FIG. 6 is an illustrative diagram of performing inter-frame transfer on object segmentation results in an embodiment of the present disclosure. As shown in FIG. 6, a process of transferring the object segmentation result of the adjacent frame (a preceding frame) to the current frame (the succeeding frame) via the transfer network in any one of the embodiments of the method for segmenting a video object according to the present disclosure is illustrated.

The method for segmenting a video object in any one of the foregoing embodiments of the present disclosure may further include:

training the transfer network based on a sample video, where each frame in the sample video is marked with a probability map.

In an optional implementation of any one of the embodiments of the present disclosure, an iterative training method or a gradient update method may be used to train the transfer network based on a marking probability map of the sample video and a probability map output by the transfer network, to adjust parameter values of network parameters in the transfer network.

When the iterative training method is used to train the transfer network based on the marking probability map of the sample video and the probability map output by the transfer network, the training is completed if a preset condition is satisfied, where the preset condition, for example, may be that the number of trainings reaches a preset number threshold, or the difference between the probability map output by the transfer network for the sample video and the marking probability map of the sample image satisfies a preset difference value.

When the gradient update method is used to train the transfer network based on the marking probability map of the sample video and the probability map output by the transfer network, the difference between the probability map output by the transfer network for the sample video and the marking probability map of the sample image may be obtained, the parameter values of the network parameters in the transfer network are adjusted by using the gradient update method, so as to minimize the difference between the probability map output by the transfer network for the sample video and the marking probability map of the sample image.

In one of optional examples, the operation of training the transfer network based on the sample video may include:

training a first neural network based on the sample video, and training a second neural network based on the sample video;

training the transfer network based on the sample video in response to the completion of the trainings of the first neural network and the second neural network.

Similarly, the iterative training method or the gradient update method may be used to train each network to be trained, based on the marking probability map of the sample video and a probability map output by the network to be trained (the first neural network, the second neural network, and/or the transfer network), to adjust the parameter values of the network parameters in each network to be trained. Details are not described herein again. The methods of training the first neural network, the second neural network, and the transfer network may be the same, and may also be different. For example, the iterative training method may be used to train the first neural network and the second neural network, and the gradient update method may be used to train the transfer network.

Based on this embodiment, independent training is performed on the first neural network and the second neural network separately. After the trainings of the first neural network and the second neural network are completed, the entire transfer network including the first neural network and the second neural network is trained, thereby facilitating improving the network training result of the network and enhancing the network training efficiency.

Any method for segmenting a video object provided in the embodiments of the present disclosure may be executed by any appropriate device having a data processing capability, including, but not limited to, a terminal and a server, etc. Alternatively, any method for segmenting a video object provided in the embodiments of the present disclosure may be executed by a processor, for example, any method for segmenting a video object mentioned in the embodiments of the present disclosure is executed by the processor by invoking corresponding instructions stored in a memory. Details are not described below again.

Persons of ordinary skill in the art may understand that all or some steps for implementing the embodiments of the foregoing method may be achieved by a program by instructing related hardware; the foregoing program can be stored in a computer readable storage medium; when the program is executed, steps including the embodiments of the foregoing method are executed. Moreover, the foregoing storage medium includes various media capable of storing program codes such as ROM, RAM, a magnetic disk, or an optical disk.

Figure 7:
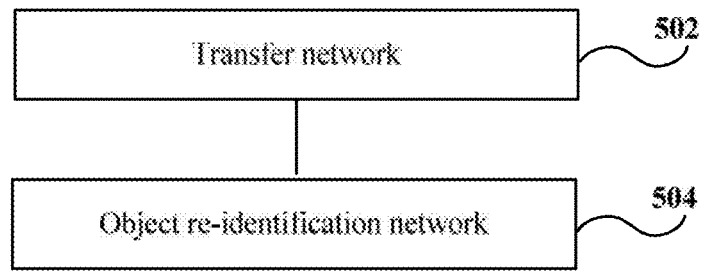
FIG. 7 is a schematic structural diagram of an embodiment of an apparatus for segmenting a video object according to the present disclosure.

FIG. 7 is a schematic structural diagram of an embodiment of an apparatus for segmenting a video object according to the present disclosure. The apparatus for segmenting a video object of this embodiment may be configured to implement any of the embodiments of the method for segmenting a video object shown in the FIGS. 1-3 of the present disclosure. As shown in FIG. 7, the apparatus for segmenting a video object of this embodiment includes: a transfer network 502 and an object re-identification network 504.

The transfer network 502 is configured to perform, among at least some frames of a video, inter-frame transfer of an object segmentation result of a reference frame in sequence from the reference frame, to obtain an object segmentation result of at least one other frame among the at least some frames; and transfer updated object segmentation results of target frames obtained by the object re-identification network 504 to the at least one other frame in the video in sequence.

The object segmentation result of the reference frame can be obtained and input to the delivery network 502 in advance, for example, by means of manual segmentation or an object segmentation network. In any one of the embodiments of the apparatus for segmenting a video object in the present disclosure, the object segmentation result may be represented as a probability map of the object. For example, the object segmentation result of each frame may be represented as a probability map, and the value of each pixel in the probability map indicates the object category of the object in the frame corresponding to the pixel. In addition, the object segmentation result of each frame may be represented as multiple probability maps, and each probability map respectively represents a probability map of an object category in the frame. In each probability map, the object category of the object in the frame corresponding to each pixel is the object category represented by the probability map, and the value of the pixel point may be 1; otherwise, the object category of the object in the frame corresponding to each pixel is not the object category represented by the probability map, and the value of the pixel point may be 0.

In one of optional examples, the reference frame may be the first frame among the at least some frames. Accordingly, the transfer network 502 is configured to perform inter-frame transfer on the object segmentation result of the first frame in a forward timing direction among the at least some frames till the last frame among the at least some frames.

In another optional example, the reference frame may be the last frame among the at least some frames. Accordingly, the transfer network 502 is configured to perform inter-frame transfer on the object segmentation result of the last frame in a reverse timing direction among the at least some frames till the first frame among the at least some frames.

In still another example, the reference frame may be a middle frame located between the first frame and the last frame among the at least some frames. Accordingly, the transfer network 502 is configured to perform inter-frame transfer on the object segmentation result of the middle frame in the forward timing direction among the at least some frames till the last frame among the at least some frames, and/or perform inter-frame transfer on the object segmentation result of the middle frame in the reverse timing direction among the at least some frames till the first frame among the at least some frames.

The object re-identification network 504 is configured to determine other frames having lost objects with respect to the object segmentation result of the reference frame among the at least some frames, and use the determined other frames as the target frames to segment the lost objects, so as to update the object segmentation results of the target frames.

Based on this embodiment, the object segmentation result of the reference frame may be transferred to the other frames among the at least some frames of the video, to make the video object segmentation results more consecutive in timing; lost object segmentation is performed on the target frames having lost objects during transfer to update the object segmentation results of the target frames, and the updated object segmentation results of the target frames are transferred to the at least one other frame in the video in sequence, so as to correct the object segmentation results transferred to the other frames, so that the transfer failure of the object segmentation results due to large changes in covering and object pose, as well as the confusion or loss of some objects in the object segmentation results occurring after multiple objects move to overlap and then separate, can be improved, and the accuracy of the video object segmentation results is increased.

In an optional example of the embodiment of the apparatus for segmenting a video object shown in FIG. 7, the transfer network 502 is configured, when performing inter-frame transfer of an object segmentation result of a reference frame in sequence from the reference frame, to obtain an object segmentation result of at least one other frame among the at least some frames, to: determine, according to the object segmentation result of a preceding frame in a propagation direction of the object segmentation result of the reference frame, the object segmentation result of a succeeding frame in the propagation direction, where the propagation direction includes the forward timing direction and/or the reverse timing frame of the video. The preceding frame includes: a neighboring frame or a neighboring key frame of the succeeding frame in the forward timing direction or the reverse timing direction among the at least some frames.

Figure 8:
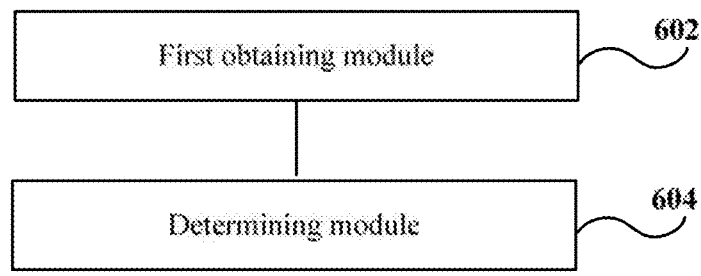
FIG. 8 is a schematic structural diagram of an embodiment of a transfer network according to the embodiments of the present disclosure.

FIG. 8 is a schematic structural diagram of an embodiment of a transfer network according to the embodiments of the present disclosure. As shown in FIG. 8, compared with the embodiment shown in FIG. 7, in this embodiment, the transfer network 502 includes:

a first obtaining module 602, configured to obtain an image block including at least one object from the succeeding frame, and obtain a probability map block of an object category corresponding to the object from an object category probability map of the preceding frame.

In any embodiment of the present disclosure, the image block may be larger than an object candidate box of the at least one object, and be less than the image of the succeeding frame in size, so that more context information can be extracted from the image block subsequently, thereby facilitating obtaining the probability map of the object more accurately.

A determining module 604 is configured to determine the object segmentation result of the at least one object in the succeeding frame at least according to the image block and the probability map block.

Figure 9:
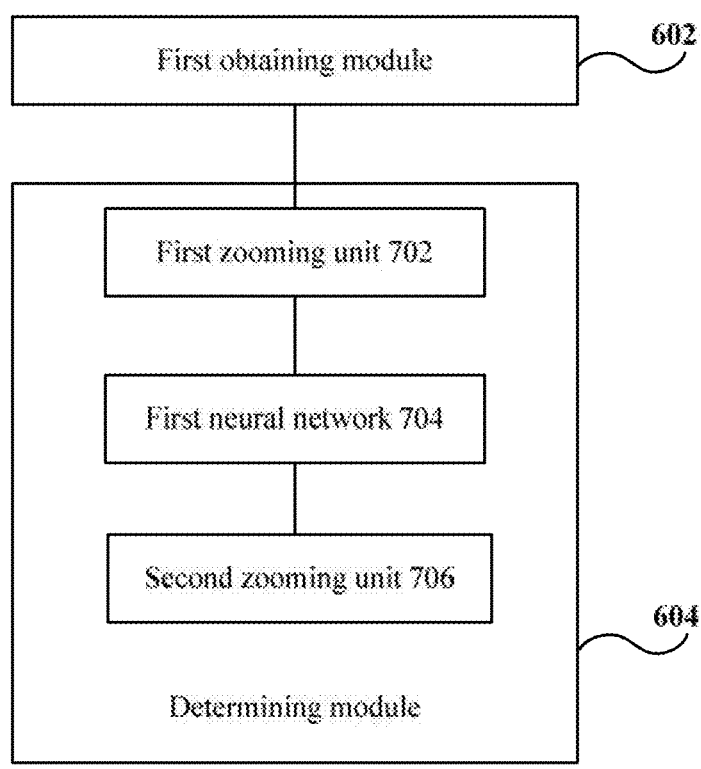
FIG. 9 is a schematic structural diagram of another embodiment of a transfer network according to the embodiments of the present disclosure.

FIG. 9 is a schematic structural diagram of another embodiment of a transfer network according to the embodiments of the present disclosure. As shown in FIG. 9, in an optional example, the determining module 604 may include:

a first zooming unit 702, configured to separately zoom in the image block and the probability map block obtained by the first obtaining module 602 to a preset size;

a first neural network 704, configured to determine the object segmentation result of the at least one object in the succeeding frame under the preset size according to the separately zoomed-in image block and probability map block; and a second zooming unit 706, configured to restore the object segmentation result of the at least one object under the preset size to the object segmentation result under an original size according to the zoom-in ratio of the first zooming unit 702 for the image block and the probability map block.

Figure 10:
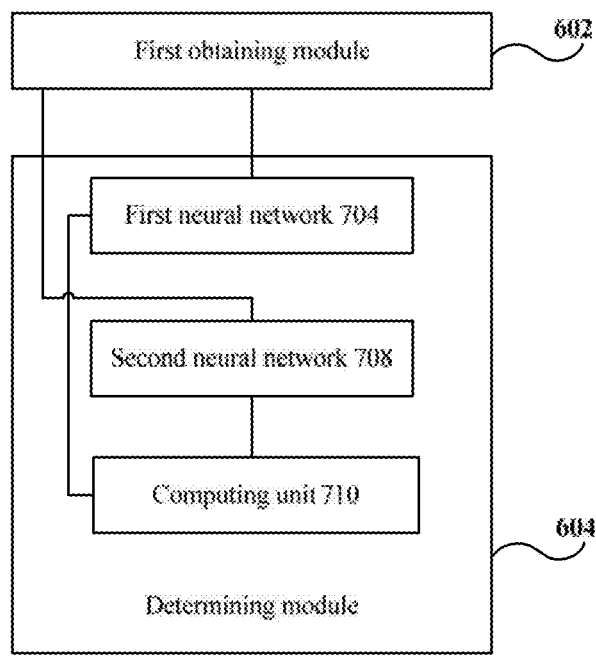
FIG. 10 is a schematic structural diagram of still another embodiment of a transfer network according to the embodiments of the present disclosure.

In another optional example, the first obtaining module 602 is further configured to obtain an optical flow map block corresponding to the at least one object according to an optical flow map between the preceding frame and the succeeding frame. Accordingly, in this embodiment, the determining module 604 is configured to: obtain the object segmentation result of the at least one object in the succeeding frame according to the image block, the probability map block, and the optional flow map block obtained by the first obtaining module 602. FIG. 10 is a schematic structural diagram of still another embodiment of a transfer network according to the embodiments of the present disclosure.

Referring to FIG. 10 again, compared with the embodiment shown in FIG. 8, in this embodiment, the determining module 604 includes:

the first neural network 704, configured to obtain a first object segmentation result of the at least one object in the succeeding frame according to the image block and the probability map block obtained by the first obtaining module 602;

a second neural network 708, configured to obtain a second object segmentation result of the at least one object in the succeeding frame according to the probability map block and the optical flow map block obtained by the first obtaining module 602; and a computing unit 710, configured to obtain the object segmentation result of the at least one object in the succeeding frame according to the first object segmentation result and the second object segmentation result.

Figure 11:
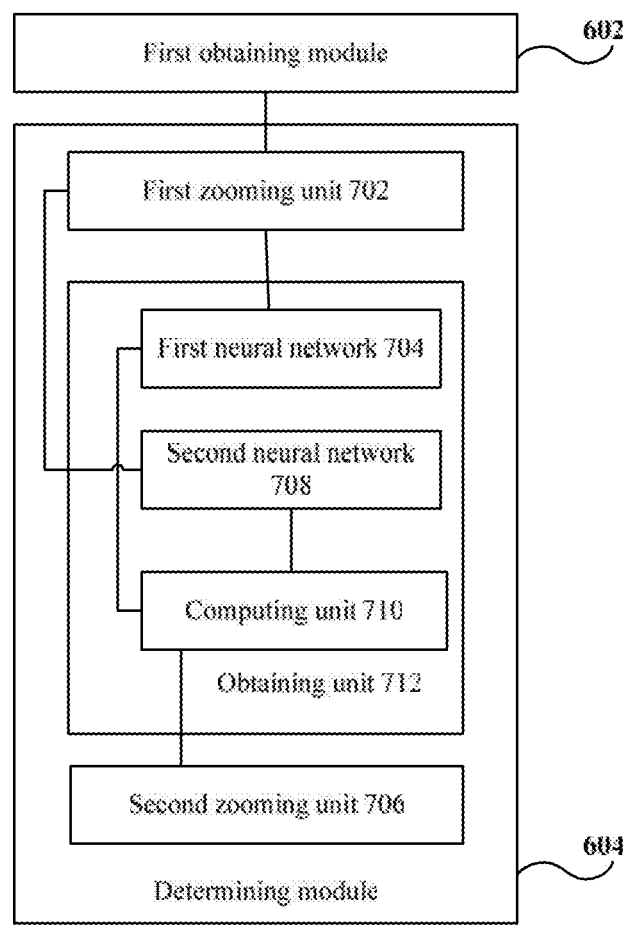
FIG. 11 is a schematic structural diagram of yet another embodiment of a transfer network according to the embodiments of the present disclosure.

FIG. 11 is a schematic structural diagram of yet another embodiment of a transfer network according to the embodiments of the present disclosure. As shown in FIG. 11, compared with the embodiment shown in FIG. 8, in the transfer network 502 of this embodiment, the determining module 604 includes:

the first zooming unit 702, configured to separately zoom in the image block, the probability map block, and the optical flow map block obtained by the first obtaining module 602 to a preset size;

an obtaining unit 712, configured to obtain the object segmentation result of the at least one object in the succeeding frame under the preset size according to the separately zoomed-in image block, probability map block, and optical flow map block; and the second zooming unit 706, configured to restore the object segmentation result of the at least one object under the preset size to the object segmentation result under an original size according to the zoom-in ratio of the first zooming unit 702 for the image block, the probability map block, and the optical flow map block.

Furthermore, referring to FIG. 11 again, in one of optional examples, the obtaining unit 712 may include:

the first neural network 704, configured to obtain a third object segmentation result of the at least one object in the succeeding frame according to the separately zoomed-in image block and probability map block;

a second neural network 708, configured to obtain a fourth object segmentation result of the at least one object in the succeeding frame according to the separately zoomed-in probability map block and optical flow map block; and a computing unit 710, configured to obtain the object segmentation result of the at least one object in the succeeding frame under the preset size according to the third object segmentation result and the fourth object segmentation result.

In an optional example of any one of the foregoing embodiments of the apparatus for segmenting a video object in the present invention, the object re-identification network 504 is configured, when determining other frames having lost objects with respect to the object segmentation result of the reference frame among the at least some frames, to:

perform, by using any other frame among the at least some frames as a current frame, object detection on the current frame to obtain an object candidate box set of the current frame;

respectively match at least one object candidate box included in an object detection box set of the current frame with the object subsequent box corresponding to the object segmentation result of the reference frame; and determine, according to the matching result, whether the current frame is one of the other frames having lost objects with respect to the object segmentation result of the reference frame.

In a further example, the object re-identification network 504 is configured, when matching the at least one object candidate box included in the object detection box set with the object candidate box corresponding to the object segmentation result of the reference frame, to: separately perform feature extraction on the at least one object candidate box included in the object detection box set, and match the features of the at least one object candidate box included in the object detection box set with the features of the object candidate box corresponding to the object segmentation result of the reference frame.

Accordingly, the object re-identification network 504 is configured, when determining, according to the matching result, whether the current frame is one of the other frames having lost objects with respect to the object segmentation result of the reference frame, to: determine, according to the matching result, whether object candidate boxes that have a feature similarity of greater than a preset threshold and are inconsistent in corresponding object categories according to the object segmentation result exist in the at least one object candidate box included in the object detection box set and the object candidate box corresponding to the object segmentation result of the reference frame; if the object candidate boxes that have the feature similarity of greater than the preset threshold and are inconsistent in corresponding object categories according to the object segmentation result exist, determine that the current frame is one of the other frames having lost objects with respect to the object segmentation result of the reference frame; otherwise, determine that the current frame is not one of the other frames having lost objects with respect to the object segmentation result of the reference frame.

In another optional example of any one of the foregoing embodiments of the apparatus for segmenting a video object in the present invention, the object re-identification network 504 is configured, when determining other frames having lost objects with respect to the object segmentation result of the reference frame among the at least some frames, to:

separately perform object detection on at least one other frame among the at least some frames to obtain an object candidate box set;

match at least one object candidate box included in an object detection box set with the object candidate box corresponding to the object segmentation result of the reference frame; and determine the other frames having lost objects with respect to the object segmentation result of the reference frame among the at least some frames according to the matching result.

In a further example, the object re-identification network 504 is configured, when matching the at least one object candidate box included in the object detection box set with the object candidate box corresponding to the object segmentation result of the reference frame, to: separately perform feature extraction on the at least one object candidate box included in the object detection box set, and match the features of the at least one object candidate box included in the object detection box set with the features of the object candidate box corresponding to the object segmentation result of the reference frame.

Accordingly, the object re-identification network 504 is configured, when determining the other frames having lost objects with respect to the object segmentation result of the reference frame among the at least some frames according to the matching result, to: obtain, according to the matching result, object candidate boxes that have a feature similarity of greater than a preset threshold and are inconsistent in corresponding object categories according to the object segmentation result in the at least one object candidate box included in the object detection box set and the object candidate box corresponding to the object segmentation result of the reference frame; and obtain the frames corresponding to the object candidate boxes in the object detection box set that have the feature similarity of greater than the preset threshold and are inconsistent in corresponding object categories according to the object segmentation result, as the other frames having lost objects with respect to the object segmentation result of the reference frame.

In the foregoing another optional example, the object re-identification network 504 is configured, when using the determined other frames as the target frames, to: if the other frames having lost objects with respect to the object segmentation result of the reference frame among the at least some frames are plural, select one of the other frames having lost objects with respect to the object segmentation result of the reference frame as the target frame.

In still another optional example of the foregoing at least one embodiment of the apparatus for segmenting a video object in the present disclosure, the transfer network 502 is configured to, when transferring the updated object segmentation result of the target frame to the at least one other frame in the video, to:

obtain consecutive frames in which the lost objects are lost among the at least some frames; and transfer the updated object segmentation result of the target frame to the at least one other frame among the consecutive frames in sequence.

The at least one other frame includes: the first frame among the consecutive frames, and accordingly, the transfer network 502 is configured to transfer the updated object segmentation result of the target frame to the last frame among the consecutive frames in sequence in the forward timing direction among the consecutive frames; or the at least one other frame includes: the last frame among the consecutive frames, and accordingly, the transfer network 502 is configured to transfer the updated object segmentation result of the target frame to the first frame among the consecutive frames in sequence in the reverse timing direction among the consecutive frames; or the at least one other frame includes: a middle frame located between the first frame and the last frame among the consecutive frames, and accordingly, the transfer network 502 is configured to: transfer the updated object segmentation result of the target frame to the last frame among the consecutive frames in sequence in the forward timing direction among the consecutive frames; and/or transfer the updated object segmentation result of the target frame to the first frame among the consecutive frames in sequence in the reverse timing direction among the consecutive frames.

An embodiment of the present disclosure further provides another apparatus for segmenting a video object. As one of the embodiments of the another apparatus for segmenting a video object, reference may be made to the structure shown in FIG. 8, the apparatus includes a first obtaining module 602 and a determining module 604.

The first obtaining module 602 is configured to obtain an image block including at least one object from a current frame in a video; and obtain a probability map block of an object category corresponding to the at least one object from an object category probability map of an adjacent frame of the current frame.

The adjacent frame of the current frame includes: a neighboring frame or a neighboring key frame of the current frame in the video in the forward timing direction or the reverse timing direction. The image block may be larger than an object candidate box of the at least one object, and be less than the image of the succeeding frame in size, so that more context information can be extracted from the image block subsequently, thereby facilitating obtaining the probability map of the at least one object more accurately.

In this embodiment of the present disclosure, by determining the object segmentation result of the at least one object in the current frame based on the image block including the object in the current frame, small-sized objects and detailed information in images can be effectively captured, and background noise interference in the images can be reduced, and therefore, the transfer failure of the object segmentation results due to the small size and the large size change of any object in the frames is improved, and the accuracy of the video object segmentation results is increased.

The determining module 604 is configured to determine the object segmentation result of the object in the current frame at least according to the image block and the probability map block.

Referring to FIG. 9, in one of optional examples of another embodiment of the apparatus for segmenting a video object, the determining module 604 may include:

a first zooming unit 702, configured to separately zoom in the image block and the probability map block obtained by the first obtaining module 602 to a preset size;

a first neural network 704, configured to obtain the object segmentation result of the at least one object in the current frame under the preset size according to the separately zoomed-in image block and probability map block; and a second zooming unit 706, configured to restore the object segmentation result of the at least one object under the preset size to the object segmentation result under an original size according to the zoom-in ratio of the first zooming unit 702 for the image block and the probability map block.

In the embodiments of the present disclosure, by obtaining the object segmentation result of the current frame based on the image block of an object zoomed-in to the preset size extracted from the current frame and the optical flow map and the probability map block of the object zoomed-in to the preset size extracted from the adjacent frame, small-sized objects and detailed information in images can be effectively captured, and the object segmentation result of the current frame can be obtained more accurately, so that inter-frame transfer of the object segmentation result is implemented, the possibility of transfer failure of the object segmentation results due to the small size, the large size change and the like of any object in the frames is reduced, and the accuracy of the video object segmentation results is increased.

In another optional example of the foregoing another embodiment of the apparatus for segmenting a video object, the first obtaining module 602 is further configured to obtain an optical flow map block corresponding to the at least one object according to an optical flow map between the adjacent frame and the current frame. Accordingly, in this embodiment, the determining module 604 is configured to: obtain the object segmentation result of the at least one object in the current frame according to the image block, the probability map block, and the optional flow map block obtained by the first obtaining module 602.

In the embodiments of the present disclosure, by obtaining the object segmentation result of the current frame based on the image block of at least one object zoomed-in to the preset size extracted from the current frame and the optical flow map and the probability map block of the at least one object zoomed-in to the preset size extracted from the adjacent frame, small-sized objects and detailed information in images can be effectively captured, and the object segmentation result of the current frame can be obtained more accurately, so that inter-frame transfer of the object segmentation result is implemented, the possibility of transfer failure of the object segmentation results due to the small size, the large size change and the like of any object in the frames is reduced, and the accuracy of the video object segmentation results is increased.

Referring to FIG. 10, in another optional example, the determining module 604 may include:

the first neural network 704, configured to obtain a first object segmentation result of the object in the current frame according to the image block and the probability map block obtained by the first obtaining module 602;

a second neural network 708, configured to obtain a second object segmentation result of the object in the current frame according to the probability map block and the optical flow map block obtained by the first obtaining module 602; and a computing unit 710, configured to obtain the object segmentation result of the object in the current frame according to the first object segmentation result and the second object segmentation result.

Referring to FIG. 11, in the foregoing another optional example, the determining module 604 may include:

the first zooming unit 702, configured to separately zoom in the image block, the probability map block, and the optical flow map block obtained by the first obtaining module 602 to a preset size;

an obtaining unit 712, configured to obtain the object segmentation result of the at least one object in the current frame under the preset size according to the separately zoomed-in image block, probability map block, and optical flow map block; and the second zooming unit 706, configured to restore the object segmentation result of the at least one object under the preset size to the object segmentation result under an original size according to the zoom-in ratio of the first zooming unit 702 for the image block, the probability map block, and the optical flow map block.

The obtaining unit 712 may include:

the first neural network 704, configured to obtain a third object segmentation result of the at least one object in the current frame according to the separately zoomed-in image block and probability map block;

the second neural network 706, configured to obtain a fourth object segmentation result of the at least one object in the current frame according to the separately zoomed-in probability map block and optical flow map block; and the computing unit 710, configured to obtain the object segmentation result of the at least one object in the current frame under the preset size according to the third object segmentation result and the fourth object segmentation result.

An embodiment of the present disclosure further provides an electronic device, including the apparatus for segmenting a video object according to any of the foregoing embodiments of the present disclosure.

Another electronic device provided in the embodiment of the present disclosure includes: memory, configured to store executable instructions; and a processor, configured to communicate with the memory to execute the executable instructions so as to complete the operations of the method for segmenting a video object according to any one of the forgoing embodiments of the present disclosure.

In addition, an embodiment of the present disclosure further provides a computer storage medium, configured to store computer-readable instructions. When the instructions are executed, the operations of the method for segmenting a video object according to any one of the foregoing embodiments of the present disclosure are implemented.

In addition, the embodiment of the present disclosure further provides a computer program, including computer-readable instructions. When the computer-readable instructions run in a device, a processor in the device implements the method for segmenting a video object according to any one of the foregoing embodiments of the present disclosure.

Figure 12:
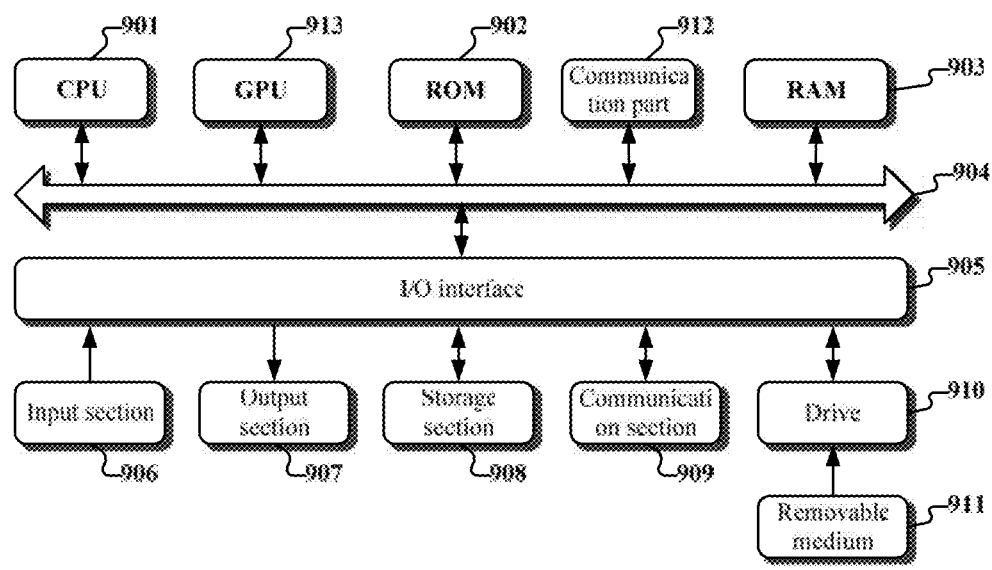
FIG. 12 is a schematic structural diagram of an application embodiment of an electronic device of the present disclosure.

FIG. 12 is a schematic structural diagram of an application embodiment of an electronic device of the present disclosure. Referring to FIG. 12 below, a schematic structural diagram of an electronic device suitable for implementing a terminal device or a server according to the embodiments of the present disclosure is shown. As shown in FIG. 12, the electronic device includes one or more processors, a communication part, and the like. The one or more processors are, for example, one or more central processing units (CPUs) 901, and/or one or more graphic processing units (GPUs) 913, and the like. The processor may perform at least one appropriate action and processing according to executable instructions stored in a read-only memory (ROM) 902 or executable instructions loaded from a storage section 908 to a random access memory (RAM) 903. The communication part 912 may include, but is not limited to, a network card. The network card may include, but is not limited to, an Infiniband (IB) network card. The processor may communicate with the ROM 902 and/or the RAM 903, to execute executable instructions. The processor is connected to the communication part 912 via a bus 904, and communicates with other target devices via the communication part 912, thereby implementing corresponding operations of any method provided in the embodiment of the present disclosure. For example, among at least some frames of a video, inter-frame transfer of an object segmentation result of a reference frame is performed in sequence from the reference frame, to obtain an object segmentation result of at least one other frame among the at least some frames; other frames having lost objects with respect to the object segmentation result of the reference frame among the at least some frames are determined; the determined other frames are used as the target frames to segment the lost objects, so as to update the object segmentation results of the target frames; and the updated object segmentation results of the target frames are transferred to the at least one other frame in the video in sequence. For another example, an image block including at least one object is obtained from a current frame in a video; a probability map block of an object category corresponding to the at least one object is obtained from an object category probability map of an adjacent frame of the current frame; and the object segmentation result of the at least one object in the current frame is determined at least according to the image block and the probability map block.

In addition, the RAM 903 may further store at least one program and data required for operations of an apparatus. The CPU 901, the ROM 902, and the RAM 903 are connected to each other via the bus 904. In the presence of the RAM 903, the ROM 902 is an optional module. The RAM 903 stores executable instructions, or writes the executable instructions into the ROM 902 during running. The executable instructions cause the processor 901 to execute corresponding operations of any method of the present disclosure. An input/output (I/O) interface 905 is also connected to the bus 904. The communication part 912 may be integrated, or may be configured to have a plurality of sub-modules (for example, a plurality of IB network cards) connected to the bus.

The following components are connected to the I/O interface 905: an input section 906 including a keyboard, a mouse and the like; an output section 907 including a cathode-ray tube (CRT), a liquid crystal display (LCD), a speaker and the like; the storage section 908 including a hard disk and the like; and a communication part 909 of a network interface card including an LAN card, a modem and the like. The communication section 909 performs communication processing via a network such as the Internet. A drive 99 is also connected to the I/O interface 905 according to needs. A removable medium 99 such as a magnetic disk, an optical disk, a magneto-optical disk, a semiconductor memory or the like is mounted on the drive 99 according to needs, so that a computer program read from the removable medium 908 may be installed on the storage section 908 according to needs.

It should be noted that the architecture illustrated in FIG. 12 is merely an optional implementation mode. During specific practice, the number and types of the components in FIG. 12 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the scope of protection of the present disclosure.

Particularly, the process described above with reference to the flowchart according to an embodiment of the present disclosure may be implemented as a computer software program. For example, the embodiments of the present disclosure include a computer program product. The computer program product includes a computer program tangibly included in a machine-readable medium. The computer program includes program code for performing the method shown in the flowchart. The program code may include instructions for performing the steps of the method provided in the embodiment of the present disclosure, for example, an instruction for performing, among at least some frames of a video, inter-frame transfer of an object segmentation result of a reference frame in sequence from the reference frame, to obtain an object segmentation result of at least one other frame among the at least some frames, an instruction for determining other frames having lost objects with respect to the object segmentation result of the reference frame among the at least some frames, an instruction for using the determined other frames as the target frames to segment the lost objects, so as to update the object segmentation results of the target frames, and an instruction for transferring the updated object segmentation results of the target frames to the at least one other frame in the video in sequence. For another example, an instruction for obtaining an image block including at least one object from a current frame in a video, an instruction for obtaining a probability map block of an object category corresponding to the at least one object from an object category probability map of an adjacent frame of the current frame, and an instruction for determining an object segmentation result of the at least one object in the current frame at least according to the image block and the probability map block.

Persons of ordinary skill in the art may understand that all or some steps for implementing the embodiments of the foregoing method may be achieved by a program by instructing related hardware; the foregoing program can be stored in a computer readable storage medium; when the program is executed, steps including the embodiments of the foregoing method are executed. Moreover, the foregoing storage medium includes various media capable of storing program codes such as ROM, RAM, a magnetic disk, or an optical disk.

Any one of the embodiments in the present specification is described in a progressive manner, emphasized descriptions of each embodiment may include a difference between this embodiment and another embodiment, and same or similar parts between the examples may be cross-referenced. The apparatus and device embodiments substantially correspond to the method embodiments and therefore are only described briefly. For related parts, refer to the related descriptions of the method embodiments.

The methods and devices in the present disclosure may be implemented in many manners. For example, the methods and devices in the present disclosure may be implemented with software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed for Many modifications and changes are obvious to persons of ordinary skill in the art. The embodiments are selected and described to better describe the principles and actual applications of the present disclosure, and to enable persons of ordinary skill in the art to understand the present disclosure, so as to design various embodiments with various modifications suitable for particular use.

The invention claimed is:
1. A method for segmenting a video object, comprising:
acquiring, among at least some frames of a video, an object segmentation result of a reference frame;
transferring, among the at least some frames of the video, the object segmentation result of the reference frame in sequence from the reference frame to at least one other frame among the at least some frames, and obtaining an object segmentation result of the at least one other frame among the at least some frames according to the object segmentation result of the reference frame;
determining other frames having lost objects with respect to the object segmentation result of the reference frame among the at least some frames;
using the determined other frames as target frames to segment the lost objects, so as to update the object segmentation results of the target frames; and
transferring the updated object segmentation results of the target frames to the at least one other frame in the video in sequence,
wherein the obtaining an object segmentation result of the at least one other frame among the at least some frames according to the object segmentation result of the reference frame comprises:
determining, according to an object segmentation result of a preceding frame in a propagation direction of the object segmentation result of the reference frame, an object segmentation result of a succeeding frame in the propagation direction, the propagation direction comprising at least one of the forward timing direction or the reverse timing frame of the video,
wherein the determining, according to the object segmentation result of the preceding frame in the propagation direction of the object segmentation result of the reference frame, the object segmentation result of the succeeding frame in the propagation direction comprises:
obtaining an image block comprising at least one object from the succeeding frame;
obtaining a probability map block of an object category respectively corresponding to the at least one object from an object category probability map of the preceding frame; and
determining the object segmentation result of the at least one object in the succeeding frame at least according to the image block and the probability map block.
2. The method according to claim 1, wherein the reference frame comprises:
the first frame among the at least some frames; the performing inter-frame transfer of an object segmentation result of a reference frame in sequence from the reference frame comprises: performing inter-frame transfer on the object segmentation result of the first frame in a forward timing direction among the at least some frames till the last frame among the at least some frames; or
the reference frame comprises: the last frame among the at least some frames; the performing inter-frame transfer of an object segmentation result of a reference frame in sequence from the reference frame comprises: performing inter-frame transfer on the object segmentation result of the last frame in a reverse timing direction among the at least some frames till the first frame among the at least some frames; or the reference frame comprises: a middle frame located between the first frame and the last frame among the at least some frames; the performing inter-frame transfer of an object segmentation result of a reference frame in sequence from the reference frame comprises at least one of the following: performing inter-frame transfer on the object segmentation result of the middle frame in the forward timing direction among the at least some frames till the last frame among the at least some frames; or performing inter-frame transfer on the object segmentation result of the middle frame in the reverse timing direction among the at least some frames till the first frame among the at least some frames.
3. The method according to claim 1, wherein the preceding frame comprises: a neighboring frame or a neighboring key frame of the succeeding frame in the forward timing direction or the reverse timing direction among the at least some frames.
4. The method according to claim 1, wherein the determining the object segmentation result of the at least one object in the succeeding frame at least according to the image block and the probability map block comprises:
separately zooming in the image block and the probability map block to a preset size;
obtaining the object segmentation result of the at least one object in the succeeding frame under the preset size according to the separately zoomed-in image block and probability map block; and
restoring the object segmentation result of the at least one object under the preset size to the object segmentation result under an original size according to the zoom-in ratio of the image block and the probability map block.
5. The method according to claim 1, further comprising:
obtaining an optical flow map block corresponding to the at least one object according to an optical flow map between the preceding frame and the succeeding frame, wherein
the determining the object segmentation result of the at least one object in the succeeding frame at least according to the image block and the probability map block comprises: determining the object segmentation result of the at least one object in the succeeding frame according to the image block, the probability map block, and the optical flow map block.
6. The method according to claim 5, wherein the determining the object segmentation result of the at least one object in the succeeding frame according to the image block, the probability map block, and the optical flow map block comprises:
obtaining a first object segmentation result of the at least one object in the succeeding frame according to the image block and the probability map block; and obtaining a second object segmentation result of the at least one object in the succeeding frame according to the probability map block and the optical flow map block; and
obtaining the object segmentation result of the at least one object in the succeeding frame according to the first object segmentation result and the second object segmentation result;
or,
the determining the object segmentation result of the at least one object in the succeeding frame according to the image block, the probability map block, and the optical flow map block further comprises:

separately zooming in the image block, the probability map block, and the optical flow map block to a preset size;

obtaining the object segmentation result of the at least one object in the succeeding frame under the preset size according to the separately zoomed-in image block, probability map block, and optical flow map block; and restoring the object segmentation result of the at least one object under the preset size to the object segmentation result under an original size according to the zoom-in ratio of the image block, the probability map block, and the optical flow map block.

7. The method according to claim 1, wherein the determining the other frames having lost objects with respect to the object segmentation result of the reference frame among the at least some frames comprises:

performing, by using any other frame among the at least some frames as a current frame, object detection on the current frame to obtain an object candidate box set of the current frame;

respectively matching at least one object candidate box comprised in an object detection box set of the current frame with the object subsequent box corresponding to the object segmentation result of the reference frame; and determining, according to the matching result, whether the current frame is one of the other frames having lost objects with respect to the object segmentation result of the reference frame.

8. The method according to claim 7, wherein the matching the at least one object candidate box comprised in the object detection box set with the object candidate box corresponding to the object segmentation result of the reference frame comprises: separately performing feature extraction on the at least one object candidate box comprised in the object detection box set; and matching the features of the at least one object candidate box comprised in the object detection box set with the features of the object candidate box corresponding to the object segmentation result of the reference frame;

the determining, according to the matching result, whether the current frame is one of the other frames having lost objects with respect to the object segmentation result of the reference frame comprises:

determining, according to the matching result, whether object candidate boxes that have a feature similarity of greater than a preset threshold and are inconsistent in corresponding object categories according to the object segmentation result exist in the at least one object candidate box comprised in the object detection box set and the object candidate box corresponding to the object segmentation result of the reference frame;

responsive to determining that the object candidate boxes that have the feature similarity of greater than the preset threshold and are inconsistent in corresponding object categories according to the object segmentation result exist, determining that the current frame is one of the other frames having lost objects with respect to the object segmentation result of the reference frame; and responsive to determining that the object candidate boxes that have the feature similarity of greater than the preset threshold and are inconsistent in corresponding object categories according to the object segmentation result do not exist, determining that the current frame is not one of the other frames having lost objects with respect to the object segmentation result of the reference frame.

9. The method according to claim 1, wherein the determining the other frames having lost objects with respect to the object segmentation result of the reference frame among the at least some frames comprises:

separately performing object detection on at least one other frame among the at least some frames to obtain an object candidate box set;

matching at least one object candidate box comprised in an object detection box set with the object candidate box corresponding to the object segmentation result of the reference frame; and determining the other frames having lost objects with respect to the object segmentation result of the reference frame among the at least some frames according to the matching result.

10. The method according to claim 9, wherein the matching the at least one object candidate box comprised in the object detection box set with the object candidate box corresponding to the object segmentation result of the reference frame comprises: separately performing feature extraction on the at least one object candidate box comprised in the object detection box set; and matching the features of the at least one object candidate box comprised in the object detection box set with the features of the object candidate box corresponding to the object segmentation result of the reference frame;

the determining the other frames having lost objects with respect to the object segmentation result of the reference frame among the at least some frames according to the matching result comprises:

obtaining, according to the matching result, object candidate boxes that have a feature similarity of greater than a preset threshold and are inconsistent in corresponding object categories according to the object segmentation result in the at least one object candidate box comprised in the object detection box set and the object candidate box corresponding to the object segmentation result of the reference frame; and obtaining the frames corresponding to the object candidate boxes in the object detection box set that have the feature similarity of greater than the preset threshold and are inconsistent in corresponding object categories according to the object segmentation result, as the other frames having lost objects with respect to the object segmentation result of the reference frame.

11. The method according to claim 9, wherein the using the determined other frames as target frames comprises:

when the other frames having lost objects with respect to the object segmentation result of the reference frame among the at least some frames are plural, selecting one of the other frames having lost objects with respect to the object segmentation result of the reference frame as the target frame.

12. The method according to claim 1, wherein the transferring the updated object segmentation results of the target frames to the at least one other frame in the video in sequence comprises:

obtaining consecutive frames in which the lost objects are lost among the at least some frames; and transferring the updated object segmentation results of the target frames to the at least one other frame among the consecutive frames in sequence.

13. The method according to claim 12, wherein the at least one other frame comprises: the first frame among the consecutive frames; and the transferring the updated object segmentation results of the target frames to the at least one other frame among the consecutive frames in sequence comprises: transferring the updated object segmentation results of the target frames to the last frame among the consecutive frames in sequence in the forward timing direction among the consecutive frames; or the at least one other frame comprises: the last frame among the consecutive frames; and the transferring the updated object segmentation results of the target frames to the at least one other frame among the consecutive frames in sequence comprises: transferring the updated object segmentation results of the target frames to the first frame among the consecutive frames in sequence in the reverse timing direction among the consecutive frames; or the at least one other frame comprises: a middle frame located between the first frame and the last frame among the consecutive frames; and the transferring the updated object segmentation results of the target frames to the at least one other frame among the consecutive frames in sequence comprises at least one of the following: transferring the updated object segmentation results of the target frames to the last frame among the consecutive frames in sequence in the forward timing direction among the consecutive frames; or transferring the updated object segmentation results of the target frames to the first frame among the consecutive frames in sequence in the reverse timing direction among the consecutive frames.

14. A non-transitory computer storage medium, having stored thereon computer-readable instructions executable by a processor, wherein the computer-readable instructions, when being executed, are configured to perform the operations of the method according to claim 1.

15. A method for segmenting a video object, comprising:
obtaining an image block comprising at least one object from a current frame in a video;
obtaining a probability map block of an object category corresponding to the at least one object from an object category probability map of an adjacent frame of the current frame; and
determining an object segmentation result of the at least one object in the current frame at least according to the image block and the probability map block,
wherein the adjacent frame of the current frame comprises: a neighboring frame or a neighboring key frame of the current frame in the video in the forward timing direction or the reverse timing direction;
wherein the determining the object segmentation result of the at least one object in the current frame at least according to the image block and the probability map block comprises:
separately zooming in the image block and the probability map block to a preset size;
obtaining the object segmentation result of the at least one object in the current frame under the preset size according to the separately zoomed-in image block and probability map block; and
restoring the object segmentation result of the at least one object under the preset size to the object segmentation result under an original size according to the zoom-in ratio of the image block and the probability map block.

16. The method according to claim 15, further comprising: obtaining an optical flow map block corresponding to the at least one object according to an optical flow map between the adjacent frame and the current frame, wherein
the determining the object segmentation result of the at least one object in the current frame at least according to the image block and the probability map block comprises: determining the object segmentation result of the at least one object in the current frame according to the image block, the probability map block, and the optical flow map block.

17. The method according to claim 16, wherein the determining the object segmentation result of the at least one object in the current frame according to the image block, the probability map block, and the optical flow map block comprises:
obtaining a first object segmentation result of the at least one object in the current frame according to the image block and the probability map block, and obtaining a second object segmentation result of the at least one object in the current frame according to the probability map block and the optical flow map block; and
obtaining the object segmentation result of the at least one object in the current frame according to the first object segmentation result and the second object segmentation result;
or,
the determining the object segmentation result of the at least one object in the current frame according to the image block, the probability map block, and the optical flow map block further comprises:
separately zooming in the image block, the probability map block, and the optical flow map block to a preset size;
obtaining the object segmentation result of the at least one object in the current frame under the preset size according to the separately zoomed-in image block, probability map block, and optical flow map block; and
restoring the object segmentation result of the at least one object under the preset size to the object segmentation result under an original size according to the zoom-in ratio of the image block, the probability map block, and the optical flow map block.

18. An apparatus for segmenting a video object, comprising:
a processor;
memory having stored therein instructions and a neural network, wherein the instructions when executed by the processor, cause the processor to perform operations of the method according to claim 15.

19. An apparatus for segmenting a video object, comprising: a transfer network and an object re-identification network, wherein
the transfer network is configured to: acquire, among at least some frames of a video, an object segmentation result of a reference frame, transfer, among the at least some frames of the video, the object segmentation result of the reference frame in sequence from the reference frame to at least one other frame among the at least some frames, and obtaining an object segmentation result of the at least one other frame among the at least some frames according to the object segmentation result of the reference frame; and transfer updated object segmentation results of target frames obtained by the object re-identification network to the at least one other frame in the video in sequence;
the object re-identification network is configured to determine other frames having lost objects with respect to the object segmentation result of the reference frame among the at least some frames; and use the determined other frames as the target frames to segment the lost objects, so as to update the object segmentation results of the target frames, wherein the transfer network is further configured to:
determine, according to an object segmentation result of a preceding frame in a propagation direction of the object segmentation result of the reference frame, an object segmentation result of a succeeding frame in the propagation direction, the propagation direction comprising at least one of the forward timing direction or the reverse timing frame of the video,
wherein the operation of determining, according to the object segmentation result of the preceding frame in the propagation direction of the object segmentation result of the reference frame, the object segmentation result of the succeeding frame in the propagation direction comprises:
obtaining an image block comprising at least one object from the succeeding frame;
obtaining a probability map block of an object category respectively corresponding to the at least one object from an object category probability map of the preceding frame; and
determining the object segmentation result of the at least one object in the succeeding frame at least according to the image block and the probability map block.

20. The apparatus according to claim 19, wherein the transfer network is further configured to:
separately zoom in the image block and the probability map block to a preset size;
obtain the object segmentation result of the at least one object in the succeeding frame under the preset size according to the separately zoomed-in image block and probability map block; and
restore the object segmentation result of the at least one object under the preset size to the object segmentation result under an original size according to the zoom-in ratio of the image block and the probability map block.

* * * * *